(12) United States Patent
Kolar et al.

(10) Patent No.: US 12,502,035 B2
(45) Date of Patent: Dec. 23, 2025

(54) SOUND INSULATED BLENDER BASE

(71) Applicant: VITA-MIX MANAGEMENT CORPORATION, Olmsted Township, OH (US)

(72) Inventors: David Kolar, Stow, OH (US); Casey Zale, Olmsted Township, OH (US); Fred H. Mehlman, Brunswick, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 968 days.

(21) Appl. No.: 17/619,280

(22) PCT Filed: Jun. 22, 2020

(86) PCT No.: PCT/US2020/038887
§ 371 (c)(1),
(2) Date: Dec. 15, 2021

(87) PCT Pub. No.: WO2020/257750
PCT Pub. Date: Dec. 24, 2020

(65) Prior Publication Data
US 2022/0240724 A1    Aug. 4, 2022

Related U.S. Application Data

(60) Provisional application No. 62/864,686, filed on Jun. 21, 2019.

(51) Int. Cl.
*A47J 43/07*  (2006.01)
*A47J 43/046*  (2006.01)

(52) U.S. Cl.
CPC ......... *A47J 43/0716* (2013.01); *A47J 43/046* (2013.01)

(58) Field of Classification Search
CPC ............................ A47J 43/0716; A47J 43/046
See application file for complete search history.

(56) References Cited

U.S. PATENT DOCUMENTS 4,892,413 A * 1/1990 Vats .................... A47J 43/0716
366/349
6,069,423 A * 5/2000 Miller ...................... H02K 5/24
310/58

(Continued)

FOREIGN PATENT DOCUMENTS

CN        207044452        2/2018
KR        101849160        5/2018

OTHER PUBLICATIONS

Patent Cooperation Treaty (PCT), International Search Report and Written Opinion for Application PCT/US2020/038887 filed Jun. 22, 2020, mailed Sep. 8, 2020, International Searching Authority, US.

*Primary Examiner* — Elizabeth Insler
(74) *Attorney, Agent, or Firm* — Dinsmore & Shohl LLP

(57) ABSTRACT

A blending system includes a blender base. The blender base includes a housing. The housing defines a cavity. A motor is disposed within the cavity. An insulating material is disposed between the housing and the cavity. The insulating material defines air channels. The air channels are in fluid communication with a fan. The fan operates independent of the motor. The motor is suspended from a suspension bracket. The suspension bracket isolates the motor from the housing.

20 Claims, 14 Drawing Sheets

(56) References Cited

U.S. PATENT DOCUMENTS

| | | | |
|---|---|---|---|
| 9,084,512 B2 * | 7/2015 | Boozer | A47J 43/0716 |
| 9,844,302 B2 | 12/2017 | Boozer | |
| 2017/0296992 A1 * | 10/2017 | Kolar | A47J 43/046 |
| 2018/0117552 A1 * | 5/2018 | Kozlowski | A47J 43/046 |

* cited by examiner

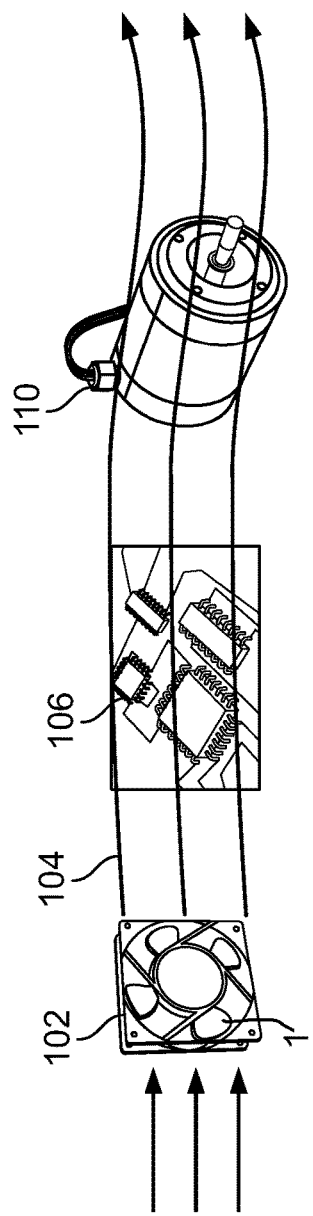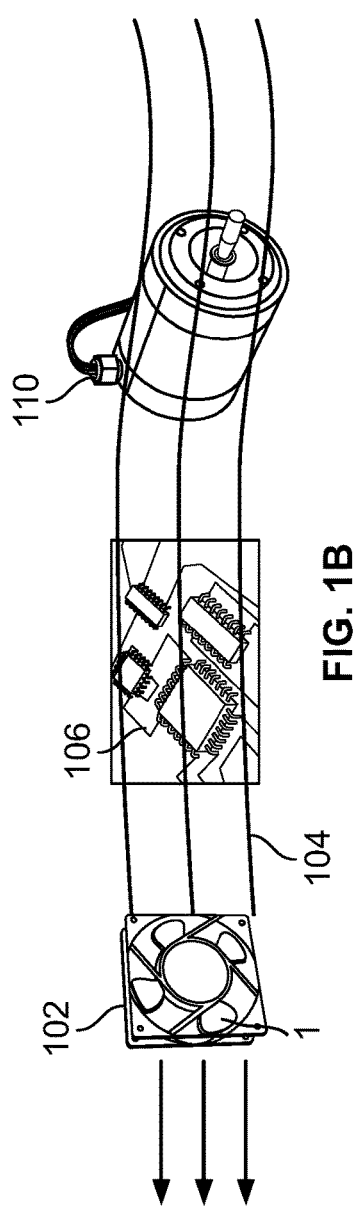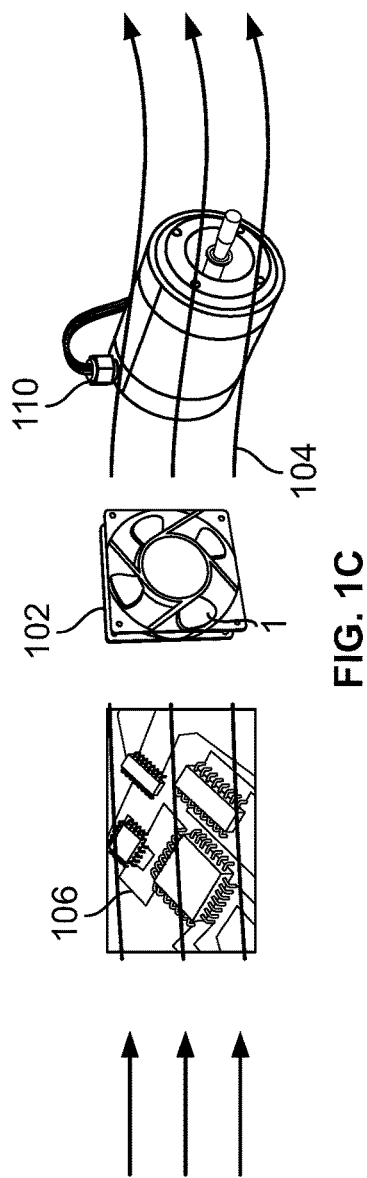

SOUND INSULATED BLENDER BASE

CROSS-REFERENCE TO RELATED APPLICATION

This application is a 35 U.S.C. § 371 national stage application of PCT Application No. PCT/US2020/038887 filed on Jun. 22, 2020, entitled "SOUND INSULATED BLENDER BASE," which claims priority to U.S. Provisional Patent Application No. 62/864,686 filed on Jun. 21, 2019, entitled "SOUND INSULATED BLENDER BASE," the entireties of which are incorporated herein by reference.

TECHNICAL FIELD

The present teachings relate to a cooling system and vibration isolation and vibration damping system for a blender, and more particularly, to an auxiliary cooling fan and construction for a blender system utilizing a fan that is controlled independent of a blade assembly.

BACKGROUND

Blender systems are often used to blend and process foodstuffs. Conventional blenders generally include a blender base with a motor, a mixing container with an operable mixing blade disposed therein. Blenders often include a fan that is driven by a motor. The motor additionally drives a blade disposed within a container. An example of such a system is described in U.S. Pat. No. 5,273,358.

These blender systems are often used to blend and process foodstuffs. Frozen, frosty, or icy drinks have become increasingly popular. Such drinks include the traditional shakes, and the more recently popular smoothies. Shakes, or milk shakes, are typically formed of ice-cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and are formed of ice, frozen yogurt, and/or sorbet, and also may include additives such as fruits, fruit juice, vitamins, supplements, etc. Smoothies typically are available from specialty chains or juice bars, and may be made with commercial or restaurant-grade blenders. Such drinks also may be made at home, using a standard personal blender. One disadvantage with making such drinks, or utilizing blenders, is the difficulty in operating the blender due to the specific ingredients required in some recipes. Blenders may get clogged or otherwise stalled by the drink ingredients. One possible cause of stalling is overheating of the motor or other portions of the blender. For instance, some blenders have a thermal shut-off that turns off a motor and blending mechanism when there is temperature build up in the blander base. This prevents damage to the blender. A user cannot use the blender again until the temperature decreases, such as below a defined threshold.

In an example, a blender may have different settings for different programs. A milkshake setting may be slower than a soup setting or the like. Thus, when a slower setting is chosen, the motor operates the fan and the blade assembly at the slower speed. The slower speed may mean that less cooling air is drawn through the blender.

Operation of blenders produces noise. Some blenders include enclosures that house a conventional electric blender so that when the blender is in operation, the noise emanating therefrom will be muffled. This noise suppression function is particularly desirable when the blender is being operated in a commercial environment, such as a restaurant or cocktail lounge, so that the customers are not distracted or bothered by the sound of the blender that is processing a beverage. The noise suppression function is also desirable in a household environment, such as early morning when other family members may be sleeping, a user can make smoothies as a breakfast item. Traditional enclosures are formed of two components, that is, a main body and a cover. Usually the cover is hingedly attached to the main body, and the main body is attached to the base of the blender by a plurality of fasteners. As such, when the container of the blender is positioned on the base, it may be accessed by pivoting the cover relative to the main body.

Such enclosures add additional space to the blender systems. The enclosures, additionally, require cleaning as users spill material. In another aspect, the closures prevent access to a blender base or container during blending operations.

Therefore, a need exists for improved blender systems, improved cooling of blender systems, improved sound reduction of a blender system, and the like.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Disclosed herein is a blender system comprising a blender base comprising a housing defining a cavity, motor disposed within the cavity of the housing, wherein the motor operatively drives a blade assembly, a fan operatively driven by a second motor, and an insulating material disposed within the cavity, wherein the insulating material contacts the housing and contacts at least a portion of the housing and at least a portion of the motor. The insulating material may at least partially support the motor. In at least one example, the blender system may include a suspension bracket disposed between the motor and the housing, wherein the motor is operatively suspended from the suspension bracket. In an example the suspension bracket may comprise a semi-ridged thermoplastic elastomer. The insulating material may define at least one air channel that allows for passage of ambient air into the housing and to the motor. The insulating material may define at least one air channel that allows for passage of air from within the housing to an exhaust of the housing. The insulating material may generally fill open space in the cavity except for at least one air channel. The blender system may include a controller that operatively controls the fan at a different speed than the motor. The blender base may comprise at least one sensor operatively sensing a temperature within the housing. The insulating material may comprise a foam.

Also described is a blender system comprising a blender container operatively coupled to a blade assembly, and a blender base comprising, a housing defining a cavity, a motor disposed within the cavity of the housing, wherein the motor operatively drives a blade assembly, a fan operatively forcing air through the housing, and an insulating material disposed within the cavity and between the motor and the housing, wherein the insulating material defines at least one air channel in fluid communication with the fan, wherein the blender container is operatively attached to the blender base. The insulating material may comprise a foam material. The insulating material may contact at least a portion of the housing and at least a portion of the motor. The insulating material may occupy space between the housing and the motor, such that the at least one air channel defines the only open space within the cavity. In an example, the at least one air channel may include at least one baffle. The insulating material may be compressed between the housing and the motor.

Further described is a blender system comprising, a blender base comprising a housing comprising a cavity, wherein the housing houses a motor, a motor drive shaft, a fan, and a control board within the cavity, and a sound insulating material within the housing, wherein the sound insulating material is disposed within the cavity, and wherein the sound insulating material is disposed around the motor, the motor drive shaft, the fan, and the control board. The sound insulating material may further define an air flow path between at least one air inlet and at least one exhaust. The fan may be disposed within the air flow path between the motor and the at least one exhaust. The sound insulating material may support at least one of the motor or the fan.

DESCRIPTION OF THE DRAWINGS

The present teachings may be better understood by reference to the following detailed description taken in connection with the following illustrations, wherein:

FIG. 1A is a blending system including a fan that may push air towards a circuit board and a motor in accordance with various disclosed aspects;

FIG. 1B is a blending system including a fan that may pull air towards a circuit board and a motor in accordance with various disclosed aspects;

FIG. 1C is a blending system including a fan that may pull air towards a circuit board and may push air towards a motor in accordance with various disclosed aspects;

DETAILED DESCRIPTION

Figure 2:
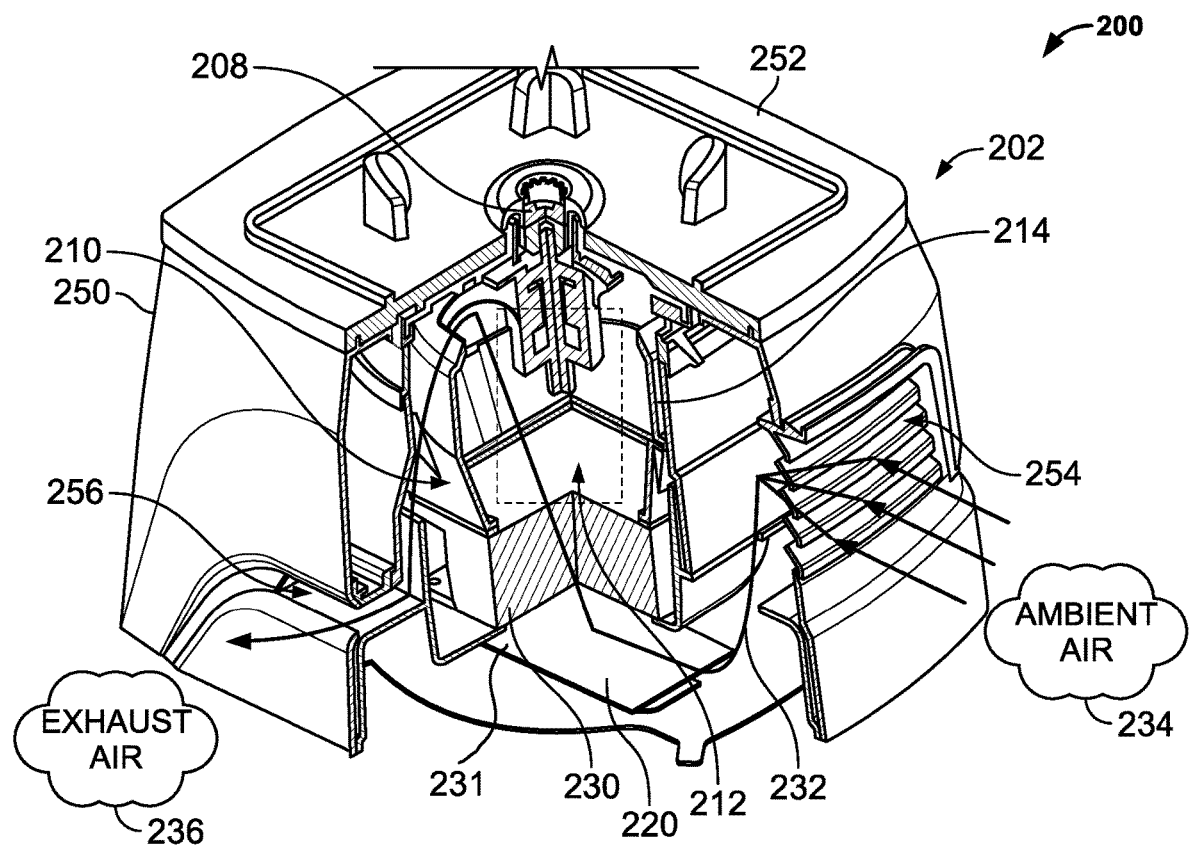
FIG. 2 is a prospective, partial and cross-sectional view of a blending system including one or more auxiliary fans in accordance with various disclosed aspects.

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings, e.g., features of each embodiment disclosed herein may be combined or replaced with features of the other embodiments disclosed herein. As such, the following description is presented by way of illustration only and should not limit in any way the various alternatives and modifications that may be made to the illustrated embodiments and still be within the spirit and scope of the present teachings.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Foodstuff may be added to the blending container. Furthermore, while blending of "ingredients," "contents" or "foodstuffs" is described by various embodiments, it is noted that non-foodstuff may be mixed or blended, such as paints, epoxies, construction material (e.g., mortar, cement, etc.), and the like. Further, the blender systems may include any household blender and/or any type of commercial blender system, including those with covers that may encapsulate or partially encapsulate the blender. Commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Further, such terms are not intended to limit possible blended products and should be viewed as examples of possible blended products.

It is noted that the term "fan" may refer to fan blades, a motor, a rotating shaft, and/or a combination thereof, as context may suggest. For instance, a blender fan may refer to the motor (which may drive a fan and a blade assembly), a shaft, and fan blades attached to the shaft. For instance, the phrase "a fan attached to the shaft of a motor," may utilize the term fan as referring to the fan blades. In another aspect, an auxiliary fan may refer to one or more fan blades, motor, and a shaft operatively driving the fan blades. As such, it is noted that the use of the term "fan" may depend on the context of the use. It is further noted that while examples may refer to a fan with reference to the blades, embodiments may utilize bladeless fans A blender system may include a blender base and a container that is operably engaged with the blender base. The blender may include a motor that operatively engages a blade assembly disposed within the container. The motor may also operatively engage and drive a primary fan. An auxiliary fan may also be comprised by the blender base. The blender base may operate the auxiliary fan at speeds that vary with respect to the speed of the blade assembly or primary fan.

In another aspect, a blender system may include a blender base and a container, a motor that operatively engages a blade assembly disposed within the container, and an auxiliary fan. The auxiliary fan may be driven at speeds that are different from the rotational speed of the blade assembly. The auxiliary fan may be driven at times when the motor is not running.

A method for operating a blender system is described herein. The method may include providing a blender base with a motor that operatively drives a mixing blade, and a container engaged within the blender base. The method may further include operating a fan at a speed that is different from the speed for the motor.

Some traditional blender systems include a motor that may run at many varying speeds. In these blender systems, the fan blades are attached integrally to the motor that controls the mixing or chopping blades. For instance, the fan blades may be affixed to a shaft of the motor or to an outer rotor. When the blades are attached directly to the motor, the rotational speed of the fan and, similarly, the amount of air drawn through the motor are directly related to the speed of the motor. Users often adjust the speed of the motor to control the mixing blades. This, however, also adjusts the speed of the fan.

When the motors are at a low speed and high load, this can create a disadvantage for cooling and conversely overheating the motor, for example. Overheating (e.g., of the motor) can occur in this condition, and may occur in a relatively short amount of time. For instance, a user may operate a blender at a low speed while mixing a thick or thickening smoothie. The thickness of the smoothie may put a high load on the motor, while the fan is operating at a low speed. Systems and methods described herein may allow for operation of fan blades independent (e.g., at different speeds) of the motor and the mixing blades. Thus, the fan blades may operate at a high speed while the motor and mixing blades operate at a low speed.

In embodiments disclosed herein, a blender may include a thermal shut-off that may turn off a motor and blending mechanism when an internal temperature exceeds a threshold temperature. This may prevent damage of the motor or other operative components of the blender. Described embodiments may operate fan blades independent of the motor to dissipate heat at an increased rate relative to blenders that do not operate fan blades independent of the motor. In another aspect, activation of the thermal shut-off may trigger activation of the fan blades.

In another example, such as in commercial settings, blenders may be used for many different sessions, where each session may be under a minute. The time between these sessions may range from seconds to minutes. During the down time, or time between sessions, the fan is not operating because the motor is not operating. This may limit the cooling abilities of the blender system. Described embodiments may allow for operation of the fans so that they may cool the motor in these down times or off cycles. Such can prevent heat from building up in the blender (e.g., the motor) causing failure, stalling, or the like. Described embodiments may cool various portions of a blender system, such as a motor, housing, electronics (e.g., circuit boards, wiring, microprocessor, memory devices, communication components such Wi-Fi, NFC, or other communication systems) or the like. It is noted that examples may describe cooling of a particular part(s) for purposes of illustration. Embodiments, however, may utilize a fan to cool various other parts.

Turning to FIGS. 1A, 1B, and 1C, there are exemplary diagrams of an auxiliary fan 102 that operatively forces air through a blender system to cool a blending system that may include at least one of a circuit board 106 or a motor 110. The fan 102 may either pull or push air 104 through a blender airflow system as described in more detail herein. In an example, the orientation and positioning of the fan 102 may determine whether the fan 102 pushes or pulls the air 104 through a blender airflow system.

As an exemplary embodiment, FIG. 1A illustrates the fan 102 disposed proximal air inlet 112. The air inlet 112 may comprise a vent or opening in a blender base (as described herein). When the fan 102 is rotating its blades 1, the blades 1 will force or pull cool air from the air inlet 112 and at least one of force the: air across of the circuit board 106; onto heat sinks (not shown); around a shell/housing of the motor 110; through the motor 110 (e.g., between the rotor and stator internal to the motor 110); or the like.

FIG. 1B illustrates the fan 102 disposed proximal air outlet or exit 114. The air exit 114 may comprise an exhaust, vent or opening in a blender base (as described herein). When the fan 102 is rotating its blades 1, the blades 1 will force or pull warm air from the air inlet 112 and at least one of: force the air across of the circuit board 106; force the air onto heat sinks (not shown); force the air around a shell/housing of the motor 110; force the air through the motor 110 (e.g., between the rotor and stator internal to the motor 110); or the like.

It is noted that the fan 102 may be disposed between the circuit board 106 and the motor 110, as shown in FIG. 1C. Moreover, while FIG. 1C shows fan 102 pulling air 104 across the circuit board 106, and pushing the air 104 around or through the motor 110, it is noted that the fan 102 may pull air 104 across, around, or through the motor 110 and push the air 104 across the circuit board 106.

In another aspect, the fan 102 may operate independently of the motor 110. For instance, the fan 102 may operate at a different speed than the motor 110, including when the motor 110 is at a speed of zero (e.g., the motor is off or not rotating). Moreover, blending systems described herein may utilize various aspects as disclosed with reference to FIGS. 1A-1C.

According to various embodiments, a blending system may comprise other or different components such as a motor housing, a container, a mixing blade assembly, or the like. In at least one embodiment, the blender system may include a plurality of fans. In at least one embodiment, a blending system may not comprise a circuit board 106, may comprise a different motor 110, or the like. In another aspect, a blending system may or may not comprise a second fan that is driven by the motor 110. The fan 102 may be an auxiliary fan that may run when the motor is on or running, when the motor is off or not running, upon a triggering event (e.g., temperature reaches a threshold level), or the like. For instance, the fan 102 may not run while the motor and the primary fan are running at high speeds. This may prevent peak amperage draw conditions.

Referring now to FIG. 2, there is a blending system 200 comprising an auxiliary fan operable independent of a motor. The blending system 200 may include a blender base 202. It is noted that the blender base 202 may operatively engage with a container and blade assembly as described herein.

As illustrated, the blender base 202 may primarily comprise a shell or housing 250 that may house operative components of the blender base 202. The housing 250 may comprise a monolithically formed component (e.g., a single, unitary piece) or disparately formed components (e.g., multiple pieces removably or irremovably attached). It is noted that the housing 250 may be constructed of various materials, such as plastic, metal, glass, rubber, and the like.

Figure 4:
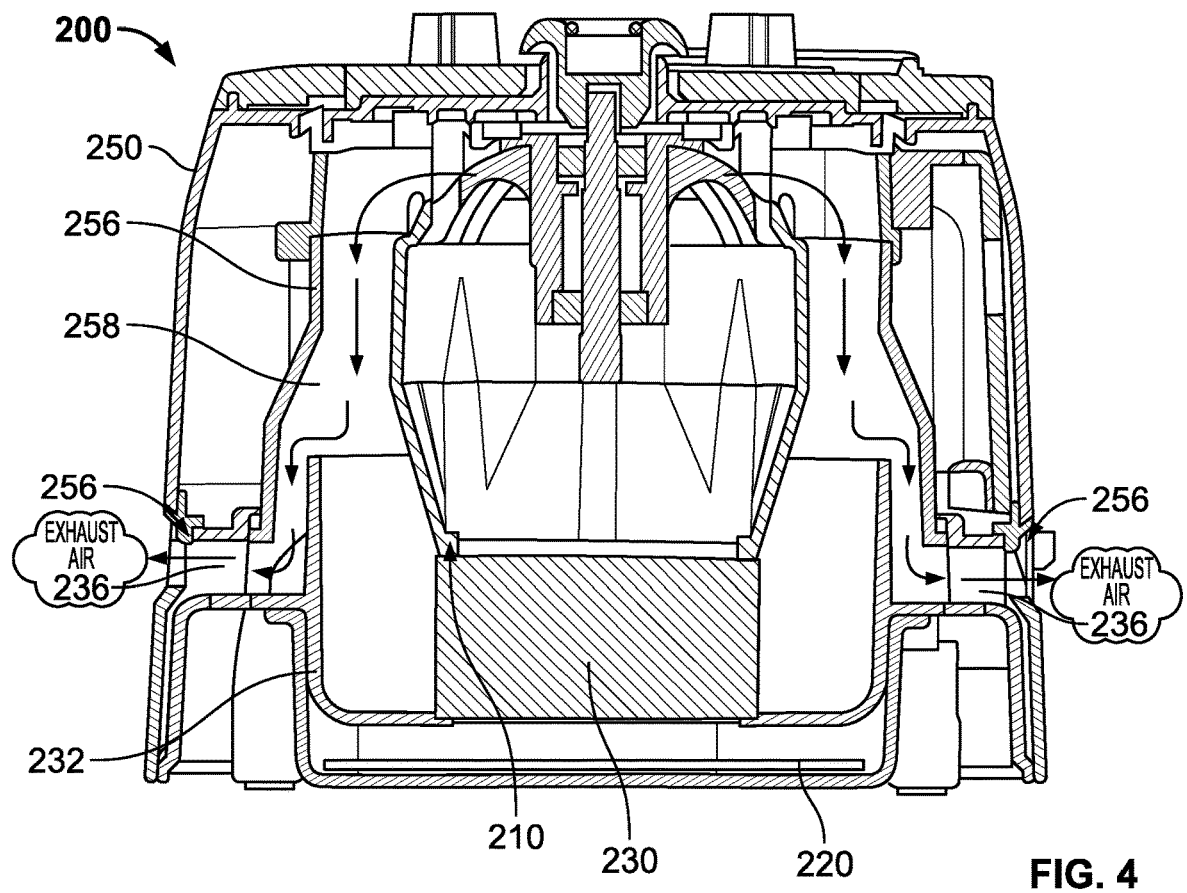
FIG. 4 is a back, cross-sectional view of the blending system of FIG. 2 in accordance with various disclosed aspects.

The housing 250 may include at least one air inlet 254 and at least one air outlet or exhaust 256. It is noted housing 250 may comprise any number of air inlets and/or exhausts disposed in any number of locations. While air inlet 254 is illustrated on a side of housing 250, it is noted that an air inlet may be disposed on a top or bottom of the housing 250. In another aspect, the air inlet 254 may comprise a vent, and may be disposed to generally prevent intake of foodstuff that may spill from a container or from user operation of the blender system 200. Moreover, while housing 250 is depicted with two exhausts 256—as shown in FIG. 4—disposed on opposed sides of the blender base 202, it is noted that housing 250 may include other or different exhausts. For instance, the housing 250 may include at least one exhaust disposed on a top, bottom, corner, or other position of blender base 202.

In embodiments, the blender base 202 may include or be coupled with a pedestal 252, which may allow a blender container (not shown) to dock or mate with the blender base 202. A blade coupler, such as splined coupler 208, may be driven by a motor 210. Motor 210 may comprise a stepper motor, switched reluctance motor, brushless motor, shunt motor, copper-brush motor, universal motor, induction motor or the like. It is noted that the motor 210 may be operatively powered by power mains, a battery, or other power source. In another aspect, the motor 210 may or may not be communicatively coupled to a circuit board 220. For instance, the circuit board 220 may control operation of the motor 210. The circuit board 220 may operatively receive input to control operation of the motor 210. The input may be input from a user interface (e.g., buttons, nobs, switches, etc.), a user device (e.g., cell phone, tablet, computer, wearable, etc.), one or more sensors (e.g., heat sensors, proximity sensors, etc.), an interlock system, or the like.

The circuit board 220 may comprise an integrated circuit having a memory, a processor, and other circuitry. A memory device or memory may store computer executable instructions and the processor may facilitate execution of the computer executable instructions. The processor may process instructions to control operations of the motor 210. For example, the instructions may facilitate execution of a particular blending process, such as a "soup," "frozen drink," or other process. It is further noted that the circuit board 220 may be coupled with a fan 230, and the instructions may control operations of the fan 230. While embodiments describe circuit board 220 coupled to and controlling the motor 210 and fan 230, it is noted that these components may comprise other or different controllers, circuit boards, memory, and/or processors. For instance, fan 230 may comprise a processor 231 that controls operation of the fan 230 independent of operation of the motor 210. However, at least for brevity, embodiments are described wherein circuit board 220 controls operations of the motor 210 and fan 230.

It is noted that the fan 230 may be operatively powered by power mains, a battery, or other power source. In at least one embodiment, blending system 200 may include a power source (not shown) that operates the fan 230 and a different power source that operates the motor 210. This may allow the blending system 200 to operate the fan 230 when the power source of the motor 210 is not connected or otherwise supplied.

In embodiments, fan 230 may be disposed in air flow path 232 to allow air from air intake 254 to be forced across and/or through the circuit board 220 and motor 210. It is noted that the air flow path 232 may comprise a fluid passage that may be directed by geometric features of the blender base 202. For instance, walls, bevels, corners, or the like may direct air from the air inlet 254 to the one or more exhausts 256. As illustrated in FIG. 2, the fan 230 may be disposed between—relative to the air flow path 232—circuit board 220 and motor 210. In this configuration, the fan 230 may pull air from air inlet 254 over the circuit board 220. The fan 230 may then push the air through or about motor 210. Moreover, while fan 230 is depicted as forcing air through a bore 212 of the motor, it is noted that the air may be directed at heat sinks (not shown), about a motor housing 214, or the like.

The air flow path 232 may allow for cool (e.g., relative to the internal temperature of the air that would otherwise be present in the blender base arising from operation of the motor) or ambient air 234 to be pulled into the housing 250 by the fan 230. The ambient air 234 may be cooler than air within the housing 250. As the fan 230 forces the air through the air flow path 232, it may absorb heat and/or fluidly force already heated air (e.g., air near or in the motor 210) towards the exhaust 256. The heated air may then exit the exhaust 256 as shown by exhaust air 236.

According to at least one embodiment, disclosed systems may be well suited for various types of motors 210. For instance, embodiments may be suited for brushless motors. It is noted, however, that various disclosed embodiments may be applicable to other types of motors.

Figure 3:
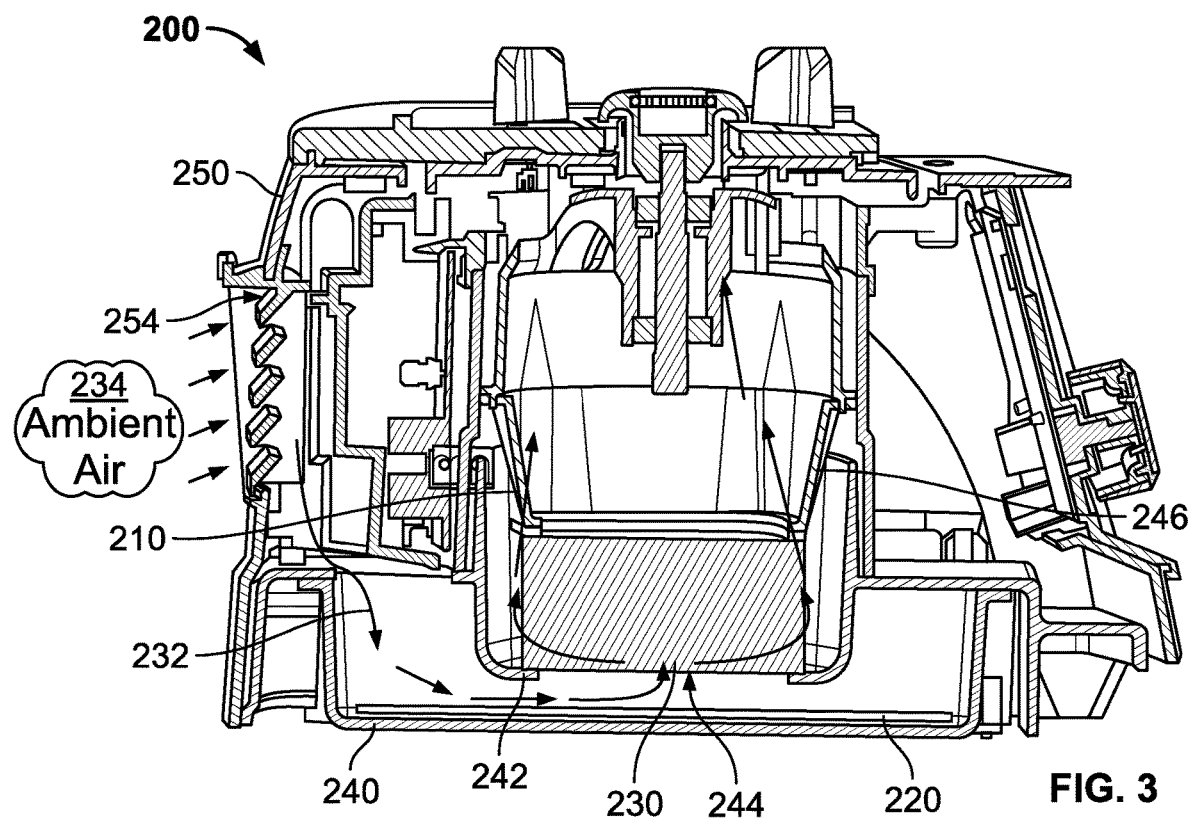
FIG. 3 is a side, cross-sectional view of the blending system of FIG. 2 in accordance with various disclosed aspects.

Turning to FIG. 3, with reference to FIG. 2, there is a partial, cross-sectional view of the blending system 200. As can be seen from this view, the ambient air 234 is drawn through the air inlet 254. The air follows the air path 232 through a lower chamber 240 and into an upper chamber 242. The upper chamber may house the fan 230. The fan 230 may force the air into motor housing 246 of motor 210.

As shown in FIG. 4, the air may be forced from motor housing 246 to an exhaust passage 258. The exhaust passage 258 may fluidly connect the motor housing 246 to the exhaust 256. While two exhausts 256 are illustrated, it is noted that the blender system 200 may comprise a different number of exhausts (e.g., 1, 3, 4, etc.). Moreover, the exhausts 256 may comprise vented apertures.

Figure 5:
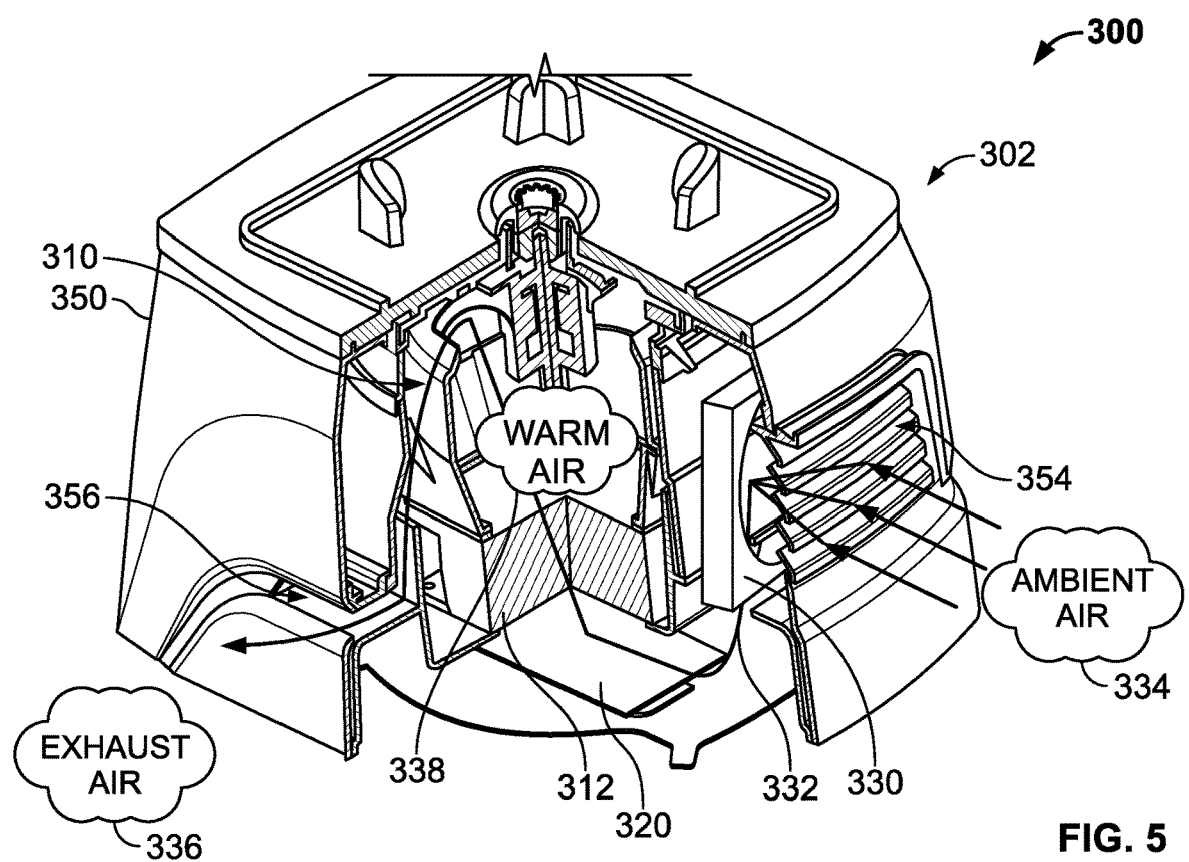
FIG. 5 is a prospective, partial and cross-sectional view of a blending system including an auxiliary fan and a motor fan in accordance with various disclosed aspects.

Referring now to FIG. 5, there is a blender base 302 of a blender system 300. It is noted that like-named components of FIG. 5 and those of the other figures may comprise similar aspects or functionality, unless context suggests otherwise or warrants a particular distinction among the terms. For instance, housing 350 may comprise similar aspects as housing 250. Likewise, motor 310 may comprise similar aspects as motor 210.

Blender base 302 may include an auxiliary fan 330 and a motor fan 312. In an example, the motor fan 312 may be driven by the motor 310, and the auxiliary fan 330 may be driven by a different motor. For instance, auxiliary fan 330 may comprise its own dedicated motor. In another aspect, auxiliary fan 330 may be coupled to and controlled by circuit board 320. The circuit board 320 may control various operations of the blender system 300 as described with reference to the various other figures. The operations may include control of motor 310 operations (which may operatively drive a blade assembly (not shown) and motor fan 312) and may control auxiliary fan 330.

One or more of motor fan 312 or auxiliary fan(s) 330 may force ambient air 334 through air intake 354, over circuit board 320, and through or about motor 310 (e.g., as shown by air flow path 332). In another aspect, warmed air 338 may be forced to exit the exhaust 356 as exhaust air 336. It is noted that the warmed air 338 may be warmed by or otherwise absorb heat. The heat may be generated by the motor 310 or other operative components of the blender base 302.

In an example, a user may attach a container (not shown) to the blender base 302. The user may utilize controls to operate the blender base 302 and cause the motor 310 to rotate a blade assembly. In certain instances, the motor 310 may produce more heat than motor fan 312 could dissipate. For instance, if the user is blending a particularly thick drink or soup at low speeds, the motor fan 312 will also be operating at low speeds. The viscosity of the drink may also cause the motor 310 to be under strain, resulting in increased heat production. Auxiliary fan 330 may operate at speeds that vary with respect to the speed of motor 310. As such, the auxiliary fan 330 may operate at a higher speed than the motor fan 312. This may increase the air flow through the blender base 302. The increased air flow may dissipate heat, may prevent the motor from overheating, and/or may prevent tripping of a thermal coupler (not shown).

As another example, a commercial smoothie shop may need to produce many smoothies in succession. This may result in blending at intervals, and shutting the motor off in between blending processes. This type of blending may result in a buildup of heat in the blender base 302. The auxiliary fan 330 may alleviate this heat by operating when motor 310 is turned off or otherwise not operating.

In some systems, a motor may operate a low speed and a high load when blending (e.g., such as when blending a thick product) relative other blending operations (e.g., such as when blending thinner products). In traditional blending systems, this may result in build up of heat as these traditional systems use the motor to operate both the fans and the mixing blades. In one or more described embodiments, the fan 330 may be driven by a separate motor and may not be driven by the motor 310 that operates the mixing blades and/or another fan. This may allow the blending system 300 to operate the fan 330 when it is needed, regardless of whether the motor 310 is operating or the speed at which the motor 310 is operating.

In another aspect, the motor 310 or mixing blades may seize up or otherwise not rotate during a blending process, such as when food stuff prevents the mixing blades from rotating. The blending system 300 may identify such conditions (e.g., via a sensor) and may determine whether or how to operate the fan 330. For instance, the blending system 300 may determine to increase a speed of fan 330 and/or turn the fan 330 on. The blending system 300 may determine to reduce the speed of the fan 330 and/or turn the fan 330 off when the motor 310 or mixing blades resume mixing or rotating.

Figure 6:
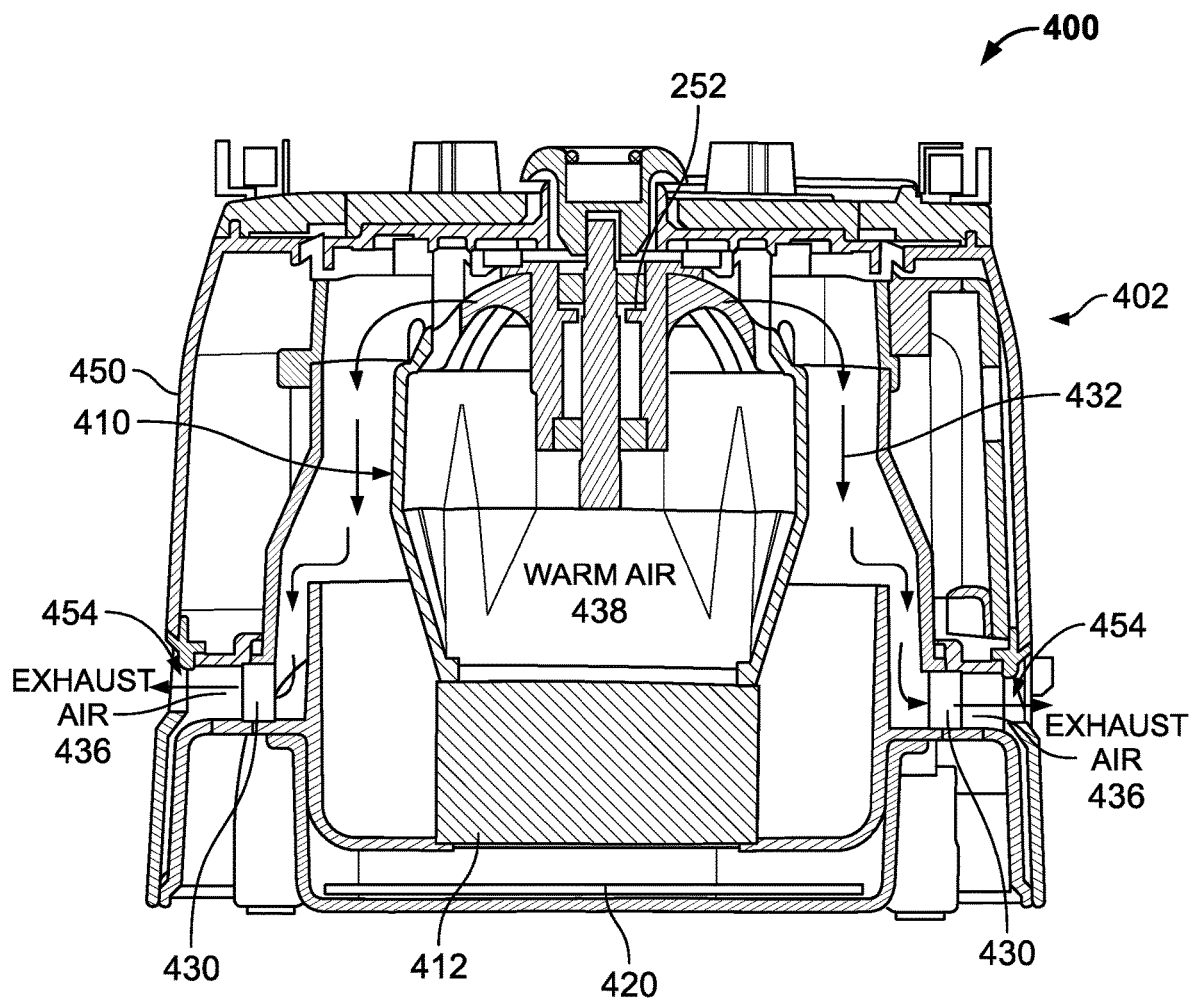
FIG. 6 is a prospective, partial and cross-sectional view of a blending system including a plurality of auxiliary fans and a motor fan in accordance with various disclosed aspects.

Referring now to FIG. 6, there is a blender base 402 of a blender system 400. It is noted that like-named components of FIG. 6 and those of the other figures may comprise similar aspects or functionality, unless context suggests otherwise or warrants a particular distinction among the terms. For instance, housing 450 may comprise similar aspects as housing 250/350. Likewise, motor 410 may comprise similar aspects as motor 210/310.

Blender base 402 may include an auxiliary fan 430 and a motor fan 412. In an example, the motor fan 412 may be driven by the motor 410, and the auxiliary fan 430 may be driven by a different motor. For instance, auxiliary fan 430 may comprise its own dedicated motor. In another aspect, auxiliary fan 430 may be coupled to and controlled by circuit board 420. The circuit board 420 may control various operations of the blender system 400 as described with reference to the various other figures. The operations may include control of motor 410 operations (which may operatively drive a blade assembly (not shown) and motor fan 412) and control of auxiliary fan 430.

One or more of motor fan 412 or auxiliary fans 430 may force ambient air 434 through an air intake (not shown), over circuit board 420, and through or about motor 410 (e.g., as shown by air flow path 432). In another aspect, warmed air 438 may be forced to exit the exhaust 456 as exhaust air 436. It is noted that the warmed air 438 may be warmed by or otherwise absorb heat. The heat may be generated by the motor 410 or other operative components of the blender base 402.

As shown, blender system 400 may include one or more auxiliary fans 430 disposed proximal one or more exhausts 454. The auxiliary fans 430 may pull warm air 438 from the blender base 402 and expel the air as exhaust air 436. It is noted that the one or more auxiliary fans may be controlled as described with reference to the various disclosed figures. It is further noted that the one or more auxiliary fans 430 may be disposed at other locations that allow the one or more auxiliary fans 430 to operatively force air to exit the one or more exhausts 454.

It is noted that the various disclosed fans (e.g., fan 102, 230, 330, 430, etc.) may have a single speed or variable speeds. Such fans may be controlled based on one or more control processes. For example, an auxiliary fan may be turned on at a desired speed based on one or more of: a temperature exceeding a threshold; a selected blending process; a duration of motor operation; a timer; manual control; current or power demand; or the like.

According to at least one embodiment, blender system 400 may include one or more sensors as disclosed herein. The one or more sensors may include, for example, a thermal or heat sensor that may detect or measure heat in the blender system 400. The sensors may be coupled to a one or more auxiliary fans 430 and/or a controller that operatively controls the one or more auxiliary fans 430. The one or more auxiliary fans 430 may operatively adjust speeds, turn on/off, or otherwise operate based on input from the sensors. In an example, the one or more sensors may be disposed at various locations. For instance, the blender system 400 may include a sensor disposed proximal motor 410 or in air flow path 432. The sensor may determine the temperature of the motor 410 and/or air in the blender base 402. A controller may receive input from the sensor and may determine whether to turn on/off the one or more auxiliary fans 430. For example, the controller may determine that the temperature is above a threshold and may control the one or more auxiliary fans 430 to force the exhaust air 436 out of the exhausts 454. It is noted that the controller may determine a speed at which the one or more auxiliary fans 430 operates, determine whether to turn on/off the one or more auxiliary fans 430, or the like.

As described herein, the one or more auxiliary fans 430 may be controlled by other devices, such as a user interface (not shown). For example, a user interface may include knobs, buttons, touch screens, or the like that control operation of the motor 410. The user interface may include a control that allows a user to selectively control the one or more auxiliary fans 430. It is noted that the blender system 400 may override a user selection to control the one or more auxiliary fans 430. In an example, a user may interact with an interface to turn off the one or more auxiliary fans 430.

If heat builds, the blender system 400 may operatively turn on the one or more auxiliary fans 430 to reduce or prevent heat buildup.

Disclosed embodiments may allow for more complex control systems compared to traditional blending systems. For instance, a controller may control parameters of the one or more auxiliary fans 430 according to need, rather than whenever the motor 410 is operating. In an example, a controller may select or determine when to turn on/off (or a speed at which to operate) the one or more auxiliary fans 430 based on a sensed temperature, select blending program, food contents within a blender container, user input, or the like.

In an aspect, a processor and memory (e.g., which may be comprised by circuit board 102, 220, 320, and/or 420) may utilize artificial intelligence, statistical models, or other processes and/or algorithms. In embodiments, the processor may utilize classifiers that map an attribute vector to a confidence that the attribute belongs to a class. For instance, the processor may input attribute vector, $x=(x1, x2, x3, x4, xn)$ mapped to $f(x)=$confidence (class). Such classification can employ a probabilistic and/or statistical-based analysis (e.g., factoring into the analysis affinities and ingredient attributes) to infer optimal or preferred times and speeds at which to operate an auxiliary fan. In various embodiments, the processor may utilize other directed and undirected model classification approaches that include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as cameras, optical scanning devices, optical scanners, spectrometer, multi-wave length scanner, electronic noses, or the like.

In accordance with various aspects of the subject specification, an example embodiment may employ classifiers that are explicitly trained (e.g., via a generic training data) as well as implicitly trained (e.g., via observing user behavior, blending information, user preferences, historical information, temperature data, current flow, receiving extrinsic information). For example, support vector machines may be configured via a learning or training phase within a classifier constructor and feature selection module. Thus, the classifier(s) may be used to automatically learn and perform a number of functions, including but not limited to, determining whether to, when, and at what speeds to operate the auxiliary fan, i.e., based solely on a single blender, or may apply across a set of the blenders. Information from the blenders may be aggregated and the classifier(s) may be used to automatically learn and perform a number of functions based on this aggregated information. The information may be dynamically distributed, such as through an automatic update, a notification, or any other method or means, to the entire user base, a subset thereof, or to an individual blender. It is noted that other devices may receive information and may program the blender to control a fan based on a desired result.

Figure 7:
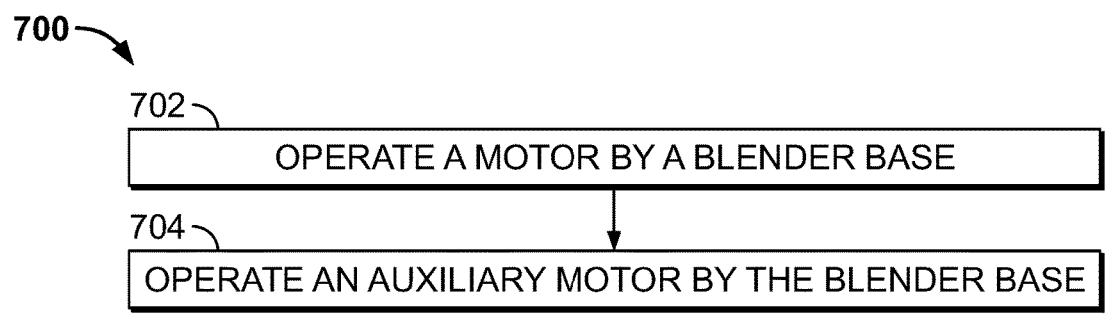
FIG. 7 is a method of operating a blender system in accordance with various disclosed embodiments.

In view of the subject matter described herein, a method that may be related to various embodiments may be better appreciated with reference to the flowchart of FIG. 7. While method 700 is shown and described as a series of blocks, it is noted that an associated method or process is not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 7 depicts an exemplary flowchart of non-limiting method 700 for managing heat in a blender system such as described herein. At 702, a blender base may operate a motor. The motor may operate a motor fan. It is noted that the blender base may or may not include a motor fan. It is further noted that the blender base may operate other components of a blender system.

At 704, the blender base may operate an auxiliary fan at the same or a different speed than the motor. For instance, the auxiliary fan may operate at a higher speed than the motor and/or than the motor fan. In another aspect, the auxiliary fan may operate when the motor is not running or is turned off.

In embodiments, to operate the auxiliary fan, the blender base (e.g., via a memory, processor, or the like) may determine an operating parameter for the auxiliary fan based on user input or sensed input. For example, the blender base may determine a speed at which to operate the auxiliary fan or a time to start/stop the fan based on one or more of a temperature of the motor, a blending program, a speed of the motor, or the like. In an example, the blender base may determine at least one of a temperature of a component of the blender base (e.g., via one or more sensors), a speed of the motor (e.g., via one or more sensors), a blending program, or the like. As described herein, the blender base may operate the auxiliary fan during particular blending programs, upon determining heat within the blender base exceeds a threshold, a motor speed exceeds a threshold (e.g., including a maximum or a minimum threshold), or the like. It is noted that the thresholds for activating or otherwise operating the auxiliary fan may be different from the threshold of a thermal shut-off (e.g., thermal coupler, thermal fuse, etc.). For instance, the threshold temperature for operating the auxiliary fan may be lower than threshold temperature for triggering the thermal shut-off. This may allow the blender base to cool before the thermal shut-off is triggered. In some embodiments, this may prevent or delay triggering the thermal shut-off.

In another example, the blending system may receive input regarding the contents within a blending container and may determine operating parameters for a fan based at least in part on the contents. The blending system may receive the input from a user (e.g., via an interface of the blending system or a separate user device), a wireless identification tag on a food package, a selected program, optical sensors (e.g., optical recognition of food stuff), thermal sensors (e.g., which may identify a temperature of foodstuff), ultra-sonic sensors, or the like. According to various embodiments, the blending system may determine whether and how to operate the fan (e.g., when to turn on/off, operate at a selected speed, etc.) based on the contents of within the blending container.

As described herein, the disclosed blending systems may determine to turn off or reduce the speed of an auxiliary fan based on a triggering event or a preprogrammed process. For instance, blending systems may turn a fan on when heat exceeds a threshold, when a motor or mixing blade stops rotating, or as otherwise described herein. The blending system may monitor operating parameters to determine that heat is dissipated below a threshold, the motor or mixing blade begin rotating, power consumption reaches a threshold, or the like. Based on the monitored operating parameters, the blending system may turn off the fan to reduce power consumption, reduce noise, or otherwise increase efficiency of the blending system.

Figure 8:
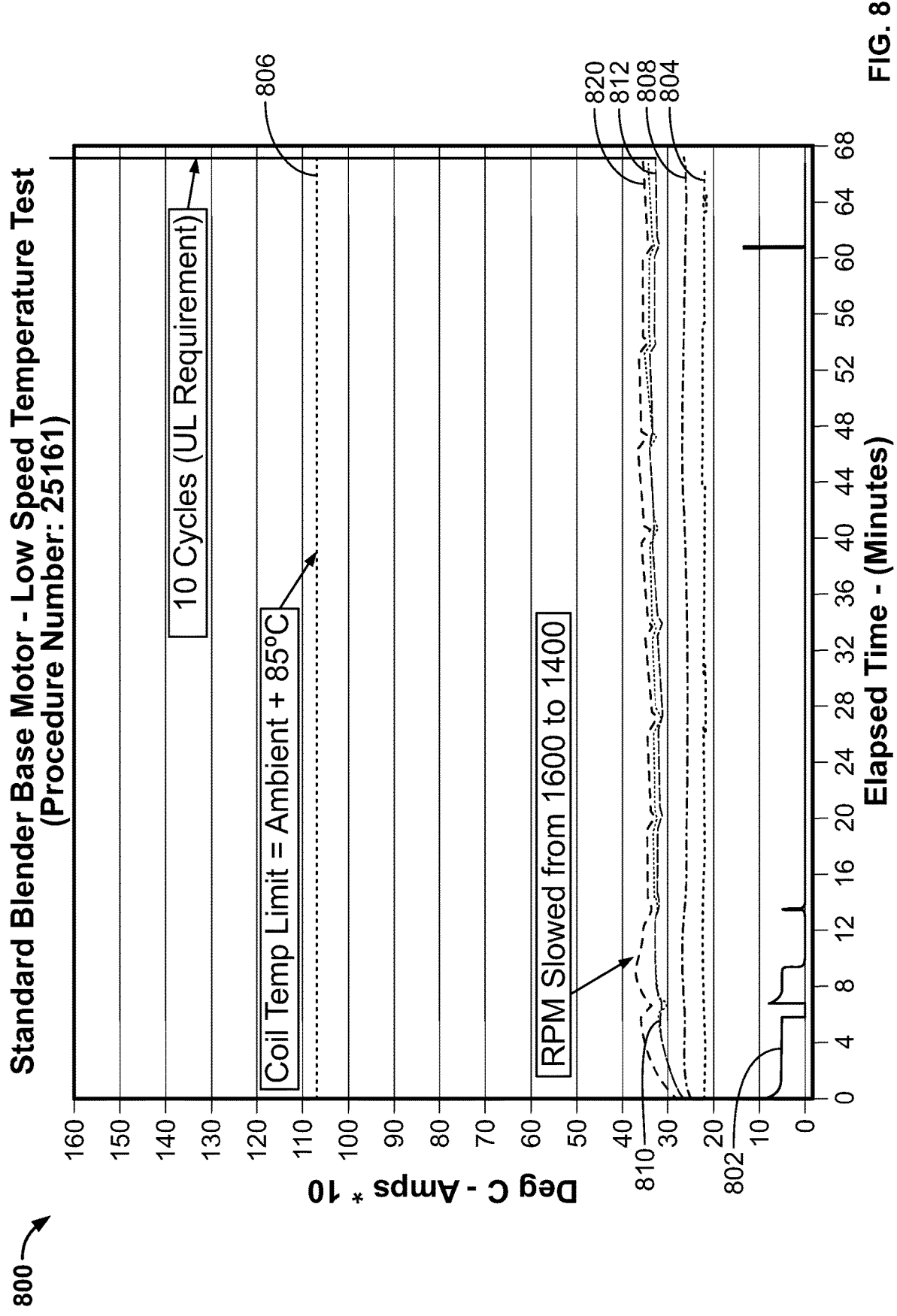
FIG. 8 is a graph showing temperature over elapsed time for a blending system operating a motor at low speed including one or more auxiliary fans.
Figure 9:
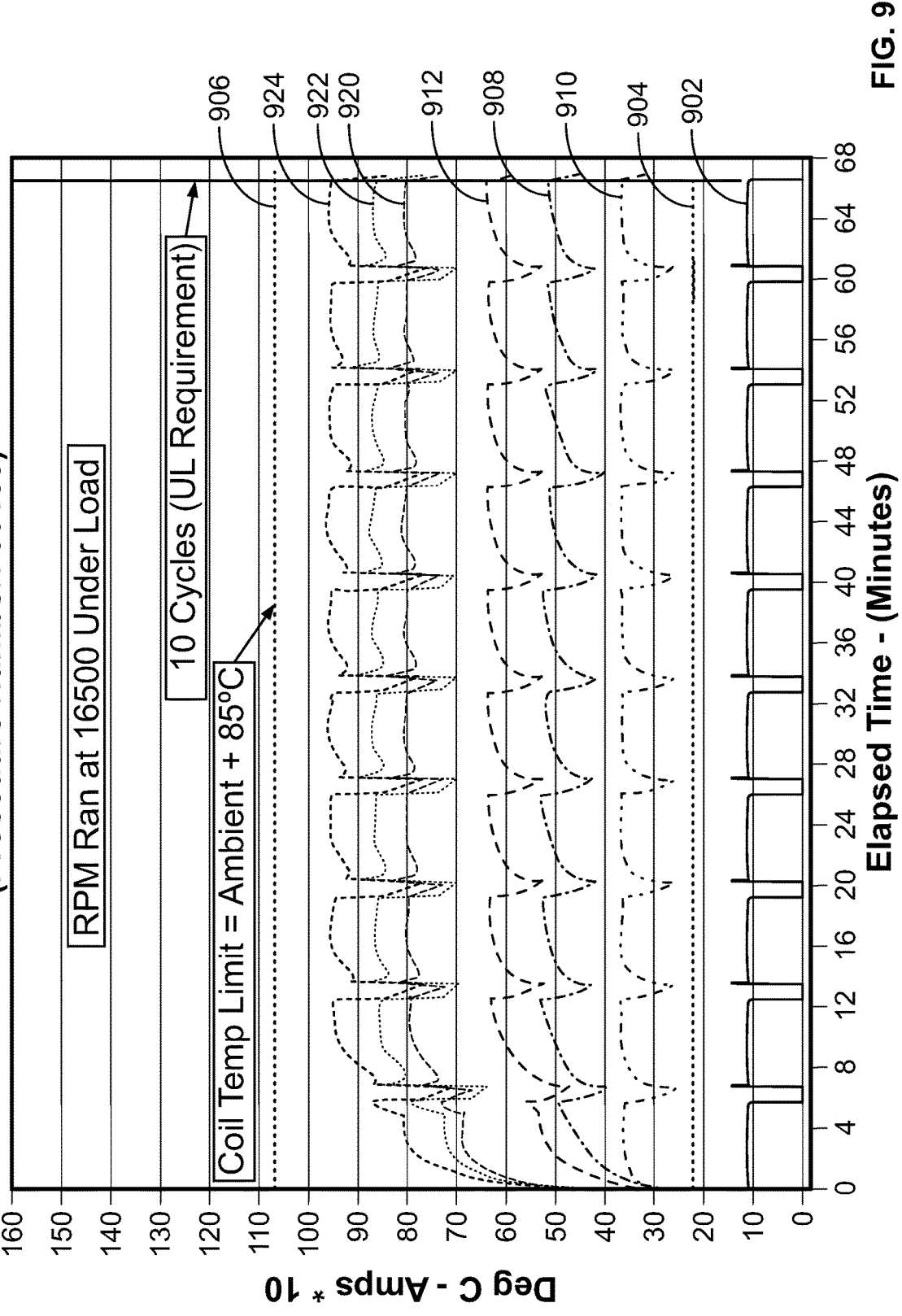
FIG. 9 is a graph showing temperature over elapsed time for a blending system operating a motor at high speed including one or more auxiliary fans.
Figure 10:
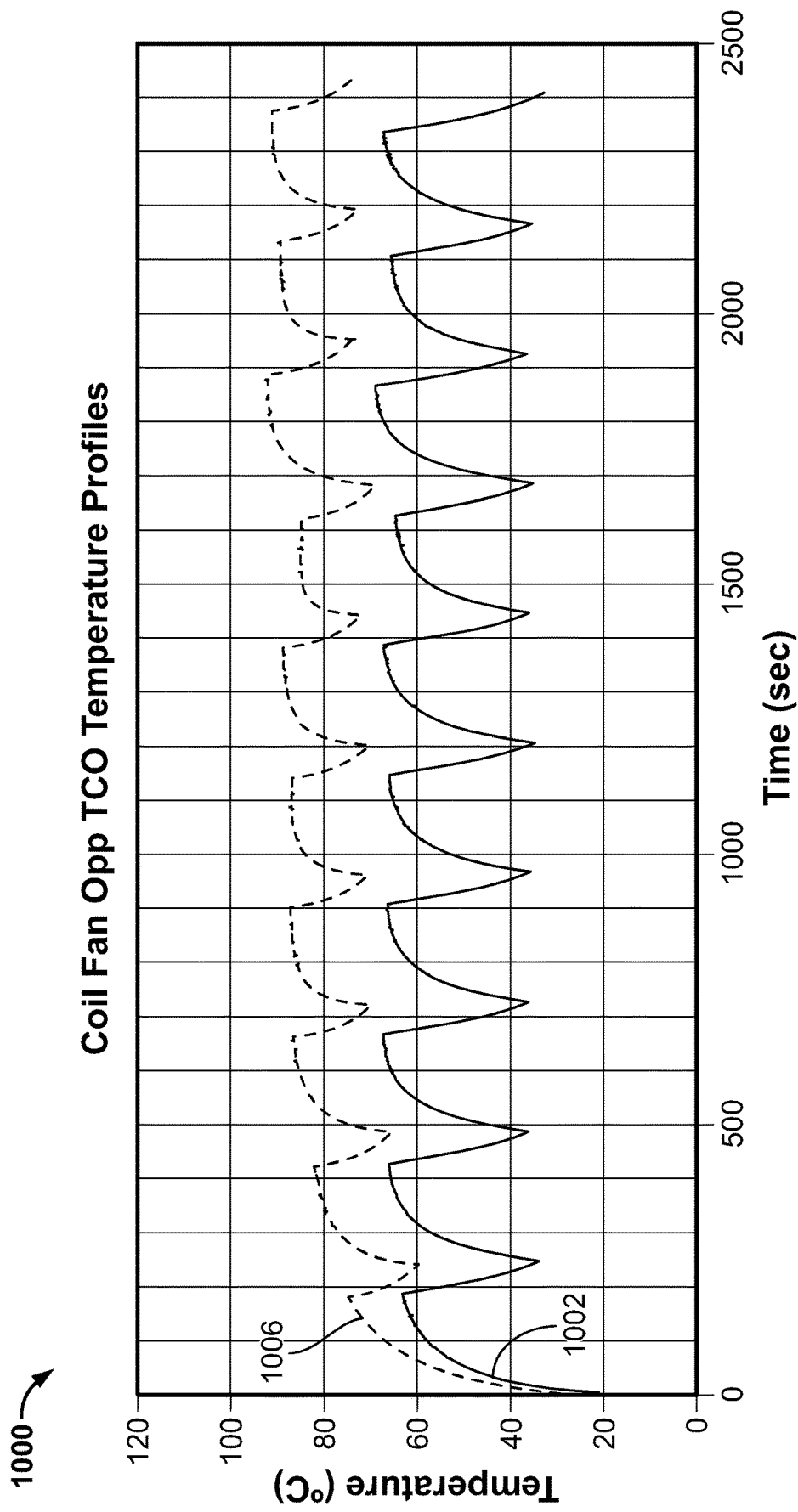
FIG. 10 is a graph showing a comparison of temperature of coils of a blending system including one or more auxiliary fans as compared to temperature of coils of a blending system not including an auxiliary fan.

Referring now to FIGS. 8-10, there are exemplary results from various tests illustrated through graphs 800, 900, and 1000. Each of the graphs 800, 900, and 1000 describes temperature (in ° C.) of various components of a blender system—as well as current (in amps×10)—versus time (in minutes) of a blending process. Furthermore, each test included ten cycles, where each cycle included running the motor for 45 minutes followed by a one minute off time. It is noted that the specific temperatures are shown as examples for a particular blending system. As such, temperatures of various other blending systems may vary.

Graph 800, shown in FIG. 8, illustrates results from a test that utilized a blender system with an auxiliary fan. For this test, 2,000 milliliters of water were placed in a 64 ounce container and the motor was run for ten cycles—as described above. The current is shown by line 802. The ambient temperature is shown as line 804 and the coil temperature limit is shown by line 806. This limit describes the maximum temperature threshold for a coil of a motor of the blender system. If the temperature of a coil exceeds this threshold, the test would be labeled as a failed test. As an example, the threshold was set at the ambient temperature plus 85° C.

During the cycles, the temperature of a bridge of the blender system was relatively stable as shown by line 808. The temperatures of a power module and motor case were clustered together around line 810, with the motor case temperature diverging at line 812. The temperature of three coils was also clustered around line 820. It can be seen that line 820 was around 70° C. below line 806—the coil temperature limit—when at its highest point.

Graph 900, shown in FIG. 9, describes results from a test that utilized carrots and water disposed in a container. The container was coupled with a blender base having an auxiliary cooling fan as described herein. It is noted that the carrots added increased resistance to blades within the container. This resulted in an increased workload for a motor of the blender system, which may increase the temperature output of the motor.

Line 902 illustrates the current of the blender system. Similar to graph 800, line 904 illustrates the ambient temperature and line 906 is the coil temperature limit. The temperatures of the bridge (line 908), power module (line 910), and motor case (line 912) were generally lower than the temperatures of the motor coils of a motor of the blender system. Three motor coils had temperatures indicated by line 920, line 922, and line 924. Line 924 was the hottest coil that peeked at 96.6° C., which was below the coil temperature limit indicated by line 906.

Graph 1000, shown in FIG. 10, illustrates the temperature difference between coils of a blender system with an auxiliary fan (line 1002) and coils of a blender system without an auxiliary fan (line 1006). It is noted that each of the blender systems included a container with water and carrots similar to the test described with reference to FIG. 9. As can be seen, line 1002 is lower than line 1006. The reduced temperature is due, at least in part, to the auxiliary fan. This is because the auxiliary fan may increase the airflow through the blender system, and increase the air flow to the coils.

Turning to FIGS. 11-16, there is a blending system 1100 that may include sound insulation within a blender base in accordance with various disclosed aspects. The blending system 1000 may generally include a blender base 1102 that may primarily comprise a shell or housing 1150. The housing 1150 may house operative components of the blender base 1102. In embodiments, the housing 1150 may include or define a cavity 1180. An insulation material 1190, such as a foam material, may be disposed within the cavity 1180 to absorb sound waves and dampen or reduce perceptible sound as described herein.

The cavity 1180 is generally filled with the insulation material 1190 from a motor 1110 to the housing 1150. It is noted that the insulation material 1190 may include passageways or cutouts that direct airflow through the housing 1150 and to operative elements. The air passages (as described herein) through the housing 1150 are constructed so that air enters and exits the motor 1110 and fan 1130 but must travel through the insulation material 1190. The sound waves traveling through the insulation material 1190 are absorbed or reduced before they exit the housing 1150. In an example, the insulation material 1190 may fill between 20% and 100% of the volumetric space within the cavity 1180 that is not occupied by the operative elements, such as the motor 1110. In some embodiments, the insulation material 1190 may fill between 50% and 75% of such volumetric space within the cavity 1180. In other embodiments, the insulation material 1190 may fill between 75% and 100% of such volumetric space within the cavity 1180. In yet further embodiments, the insulation material 1190 may fill between 20% and 50% of such volumetric space within the cavity 1180. In yet still further embodiments, the insulation material 1190 may fill between 75% and 95% of such volumetric space within the cavity 1180. It is noted that the airflow paths defined within the insulation material 1190 may be consider part of the insulation material 1190 for purposes of determining the percentage of volumetric space occupied by the insulation material 1190.

In another aspect, the insulation material 1190 absorbs sound waves and dampens the sound waves so that they do not contact the housing 1150 unimpeded. This generally prevents or reduces transmission of noise by the housing 1150. Furthermore, the insulation material 1190 touches all or most sides of the housing 1150 and the motor 1110, helping to provide dampening to the blending system 1100.

The insulation material 1190 may comprise a foam, such as a plastic or rubber foam. It is noted that the foam may include layers of different or the same material. In some embodiments, the foam may be injected into the housing 1150 such that it fills the cavity 1180, air passageways may be carved or otherwise formed via molds placed within the cavity prior to injecting the foam. In another aspect, the foam may be injection molded, carved, or otherwise formed and disposed or positioned as the blending system 1100 is assembled. It is noted that the foam may be monolithically formed or may be formed of disparate parts that may or may not be adhered together.

It is further noted that various embodiments may use different foam materials. The foam materials generally provide sound dampening and high heat resilience such that heat generated by the motor does not alter or damage the foam material. For instance, the foam material may be selected such that its melting point or degradation point exceeds internal temperatures reached within the housing 1150. For instance, the blending system 1100 may include a thermal coupler that turns-off or otherwise prevents operation of the motor 1110 when an internal temperature exceeds a threshold temperature. The foam material may be selected such that it will not be damaged by temperatures meeting or below this threshold temperature.

In another aspect, the foam material may be under compressive forces when the blending system 1100 is assembled. For instance, the foam material may be compressed between the motor 1110 and the housing 1150. This may prevent the foam material from becoming displaced or vibrating therebetween. It is further noted that the foam material may be attached to the motor 1110 or housing 1150 via fasteners, adhesives, or the like.

Figure 17:
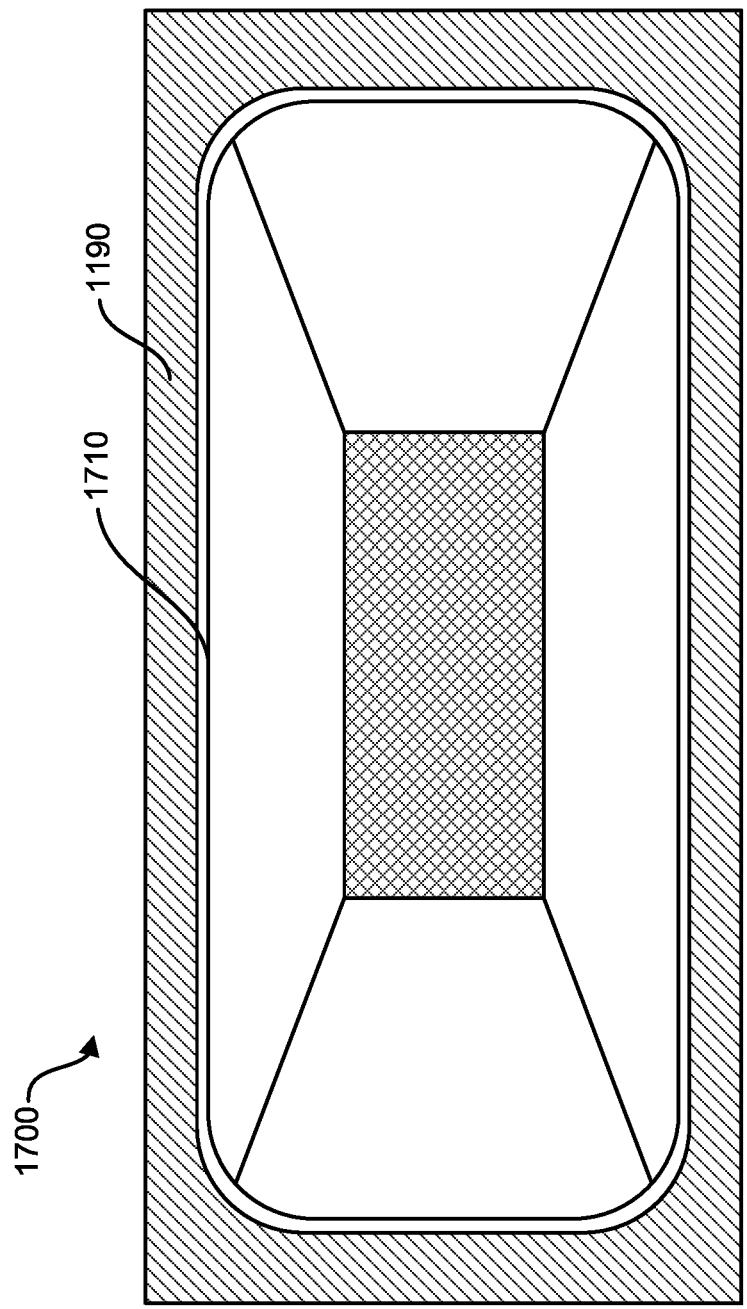
FIG. 17 is a cross-sectional view of an air channel with a liner in accordance with various disclosed embodiments.

The housing 1150 may comprise a monolithically formed component (e.g., a single, unitary piece) or disparately formed components (e.g., multiple pieces removably or irremovably attached). It is noted that the housing 1150 may be constructed of various materials, such as plastic, metal, glass, rubber, and the like. It is noted that the housing 1150 may comprise a first side 103 (e.g., front), a second side 1105, a third side 1107 and a forth side 1109 (e.g., back). The housing 1150 may include a pedestal 1152 which may allow a blender container (as shown in FIG. 17) to dock or mate with the blender base 1102. A blade coupler, such as splined coupler 1108, may be driven by the motor 1110. Motor 1110 may comprise coils 1116, a stepper motor, switched reluctance motor, brushless motor, shunt motor, copper-brush motor, universal motor, induction motor or the like. It is noted that the motor 1110 may be operatively powered by power mains, a battery, or other power source 1170.

The motor 1110 may be isolated from direct contact with the housing 1150. For instance, the motor 1110 may include a motor casting 1112. The casting 1112 may comprise a clam shell casting as described in PCT Patent Application Number US17/46487, entitled SOUND REDUCING AIRFLOW SYSTEM FOR A BLENDER SYSTEM, the entirety of which is incorporated by reference herein.

The casting 1112 may be operatively attachable to a mounting bracket 1114, which may be attached to a suspension bracket 1117. The suspension bracket 1117 may be attached to the housing 1102.

The suspension bracket 1117 may comprise a semi-ridge thermoplastic elastomer (TPE). This TPE may be connected to the housing 1150 such that the motor 1110 does not directly contact the housing 1150. This may prevent the casting 1112 and motor 1110 from direct contact with the housing 1102. The motor 1110 may thus be suspended from the suspension bracket 1117. In an aspect, the motor 1110 may be supported by the insulation material 1190 as it may contact the motor 1110. In some embodiments, the blending system 1100 may include a heat resistant material disposed between the motor 1110 and the insulation material 1190 such that heat generated by the motor 1110 does not damage the insulation material 1190. It is noted that at least some embodiments do not utilize grommets or gaskets. It is further noted that some embodiments may not use a suspension bracket 1117 and, instead, may support the motor 1110 completely by the insulating material 1190, such that the motor 1110 does not contact the housing 1150.

In accordance with various embodiments, the blender base 1102 may include a fan 1130 that may operatively force air (e.g., push or pull air) through passageways within the housing 1150. It is noted that air may be forced through the housing 1150 in a reverse flow as described in PCT Patent Application Number US17/46487, or may be forced through the housing 1150 in other or different directions.

The fan 1130 may comprise a fan motor 1132 (such as shown in FIG. 1) that drives fan blades or other air forcing devices independent of the motor 1110 such that the fan 1130 may operate when the motor 1110 is not running. In another aspect, the fan 1130 may operate at a different speed than the motor 1110 as described herein. It is noted that the fan 1130 may include an independent controller or may be controlled by a controller 1120.

As such, the blender system 1100 may include a single fan that is not driven by the motor 1110 and that may run at speeds different from the motor 1110 or may run when the motor 1110 is not running. For instance, the blender system 1100 may generate or retain heat and the fan 1130 can be kept at a first speed (e.g., low speed) or no speed until a threshold motor temperature is exceeded. The fan 1130 may then be run at a second speed (e.g., high speed) until the temperature no longer exceeds the threshold motor temperature or until another triggering event occurs (e.g., motor 1110 is no longer running or has stopped running for a period of time, temperature falls below a second threshold temperature, or the like). In some embodiments, the fan 1130 may run at variable speeds related to motor temperature to reduce the noise generated during blending. Once a blending operation completes or the motor 1110 otherwise stops running, the fan 1130 may run at a third speed (e.g., lower speed off-cycle) to lower the temperature of the motor 1110 and electronics temperature. In some examples, however, the fan 1130 may be driven by the motor 1110.

In at least some embodiments, however, the fan 1130 may be driven by the motor 1110 via drive shaft 1118, may be utilized in combination with a fan driven by a motor, or the like. It is noted that the blending system 1110 may utilize a fan and auxiliary fan as described herein.

In another aspect, the controller 1120 of the blender base 1102 may operatively control one or more of the motor 1110, the fan 1130, or a display 1164. It is noted that the controller 1120 may include a memory and processor. The memory may be configured for storing computer executable instructions and the processor may facilitate operation of the computer executable instructions. It is noted that controller 1120 may include one or more devices. As shown, the controller 1120 may be disposed on or include a circuit board 1122. The circuit board 1122 may be disposed between the insulation material 1190 and the display 1164. It is noted that the circuit board 1122 may be disposed at other locations within the housing 1150.

The controller 1120 may be communicatively coupled (e.g., wired or wirelessly) to one or more of the motor 1110, the fan 1130, or the display 1164. It is noted that the controller 1120 may include or control wireless communication devices, such as BLUETOOTH, NFC, RFID, Wi-Fi, or other devices. In some embodiments, insulation material 1190 may include passageways or ports for wired connections to the controller 1120. In examples where insulation material 1190 is injected into the housing 1150, the insulation material 1190 may envelop or form around wired connections. Generally, the controller 1120 and circuit board 1122 may be positioned such that insulation material 1190 does not contact the controller 1120 and circuit board 1122. For example, the controller 1120 or circuit board 1122 may be disposed within a compartment or be external to the housing 1150.

In an aspect, the motor 1110 may be communicatively coupled to the controller 1120. For instance, the controller 1120 may control operation of the motor 1110. The controller 1120 may operatively receive input to control operation of the motor 1110. The input may be input from a user interface (e.g., buttons, nobs, switches, etc.), a user device (e.g., cell phone, tablet, computer, wearable, etc.), one or more sensors (e.g., heat sensors, proximity sensors, etc.), an interlock system, or the like.

Figure 13:
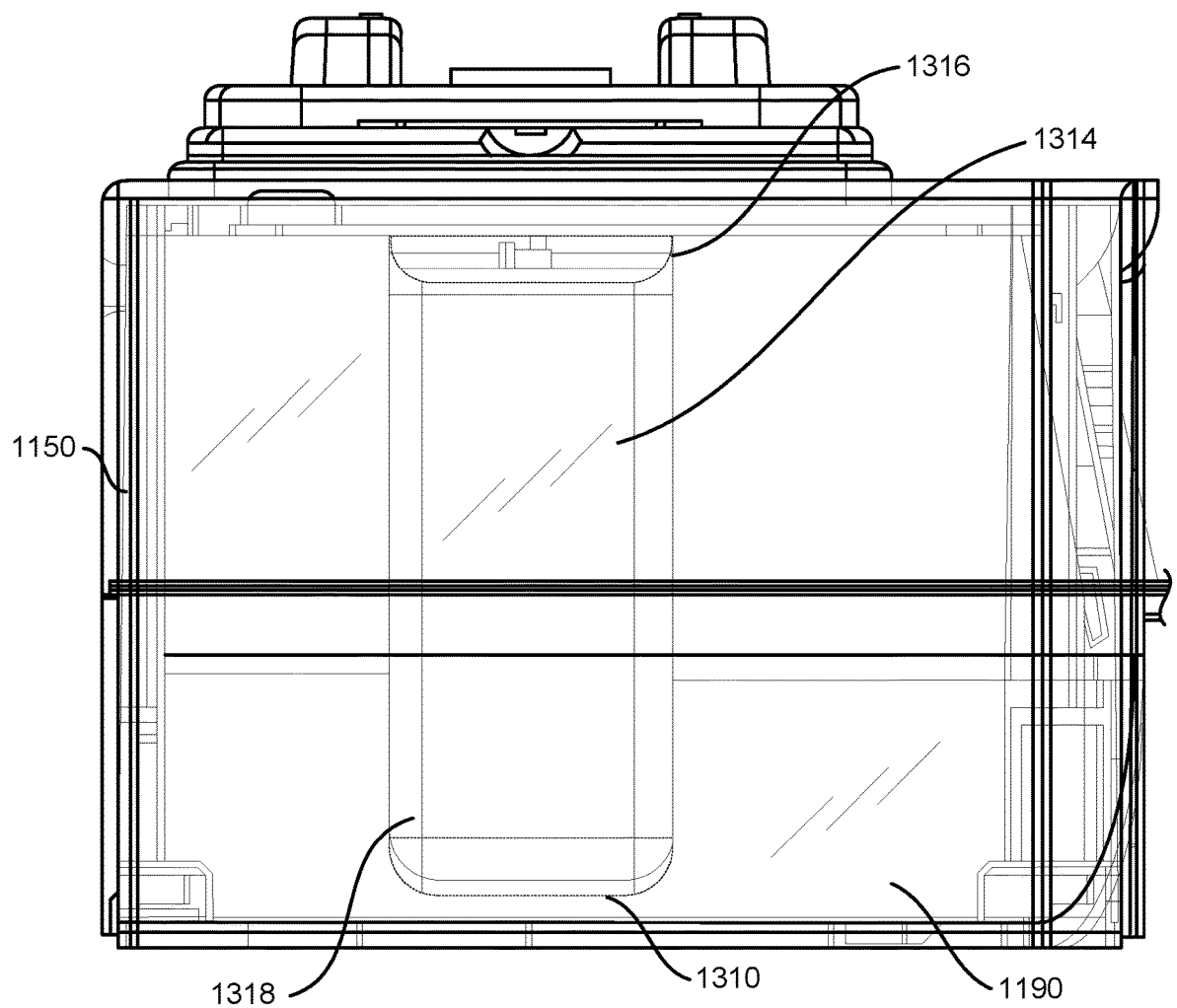
FIG. 13 is a side view of the blending system of FIG. 11 with a housing illustrated as transparent in accordance with various disclosed embodiments.
Figure 14:
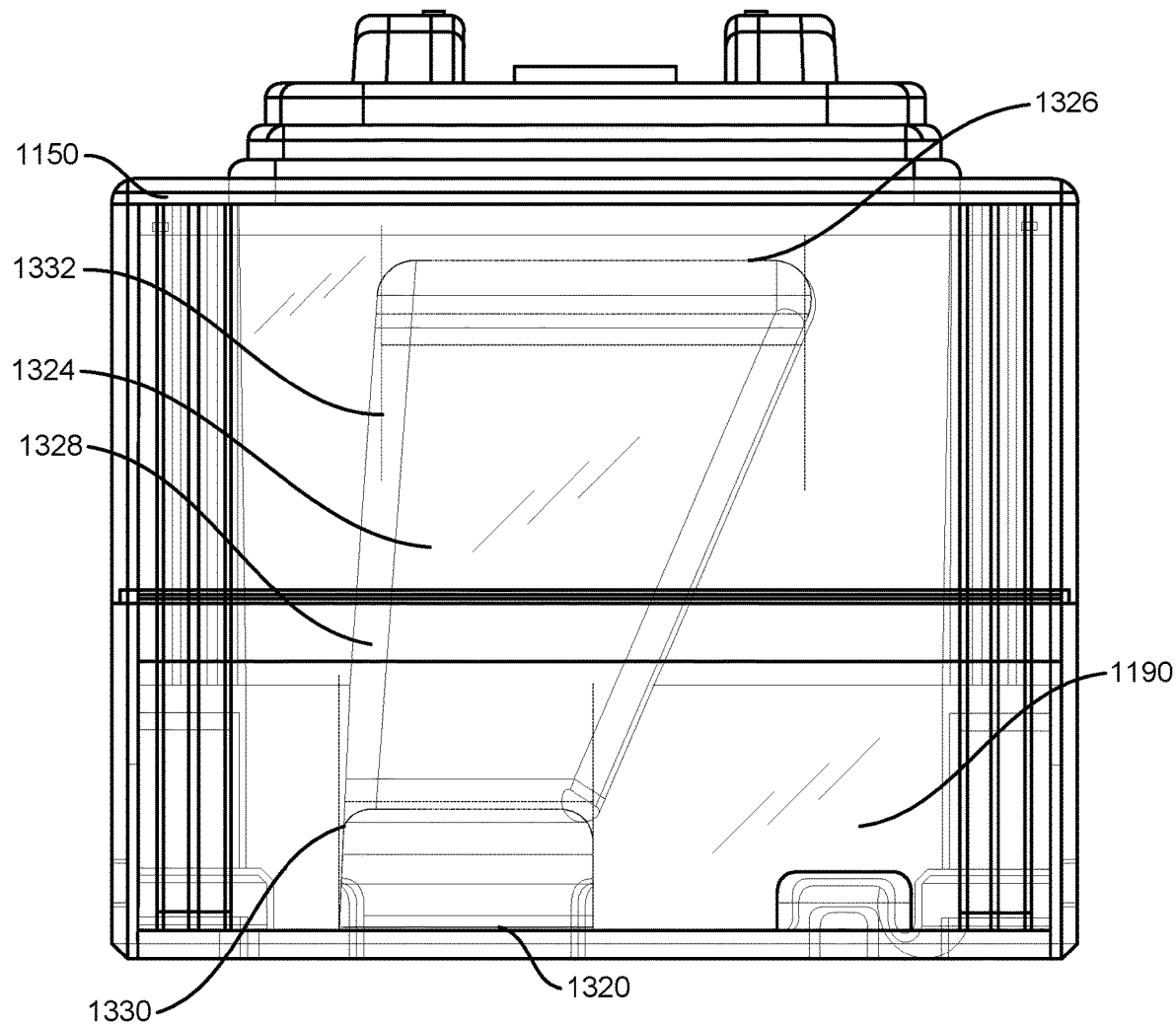
FIG. 14 is another side view of the blending system of FIG. 11 with a housing illustrated as transparent in accordance with various disclosed embodiments.

Turning now to FIGS. 13 and 14, there depicted is a view from side 1105 and a view from side 1109 (e.g., back), respectively. As with FIGS. 11-12, these views illustrate the housing 1150 as transparent for purposes of explanation.

FIGS. 13 and 14 best show the air intake and exhaust for the blending system 1100. While this disclosure generally describes intakes and exhausts disposed at a particular location or with general shapes, it is noted that embodiments may utilize other or different arrangements.

Figure 11:
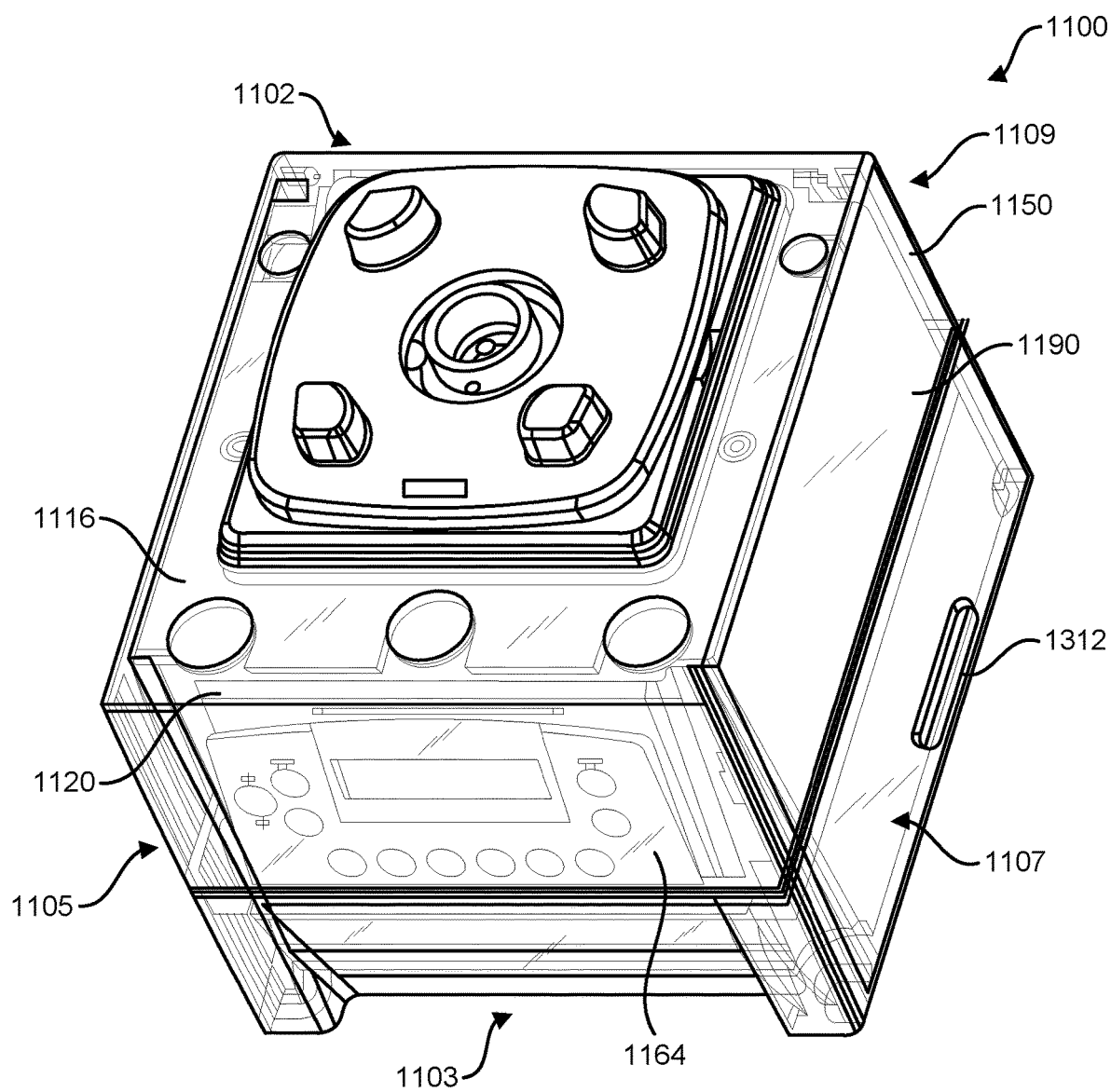
FIG. 11. is a perspective view of a blending system including an insulating material in accordance with various disclosed embodiments.
Figure 12:
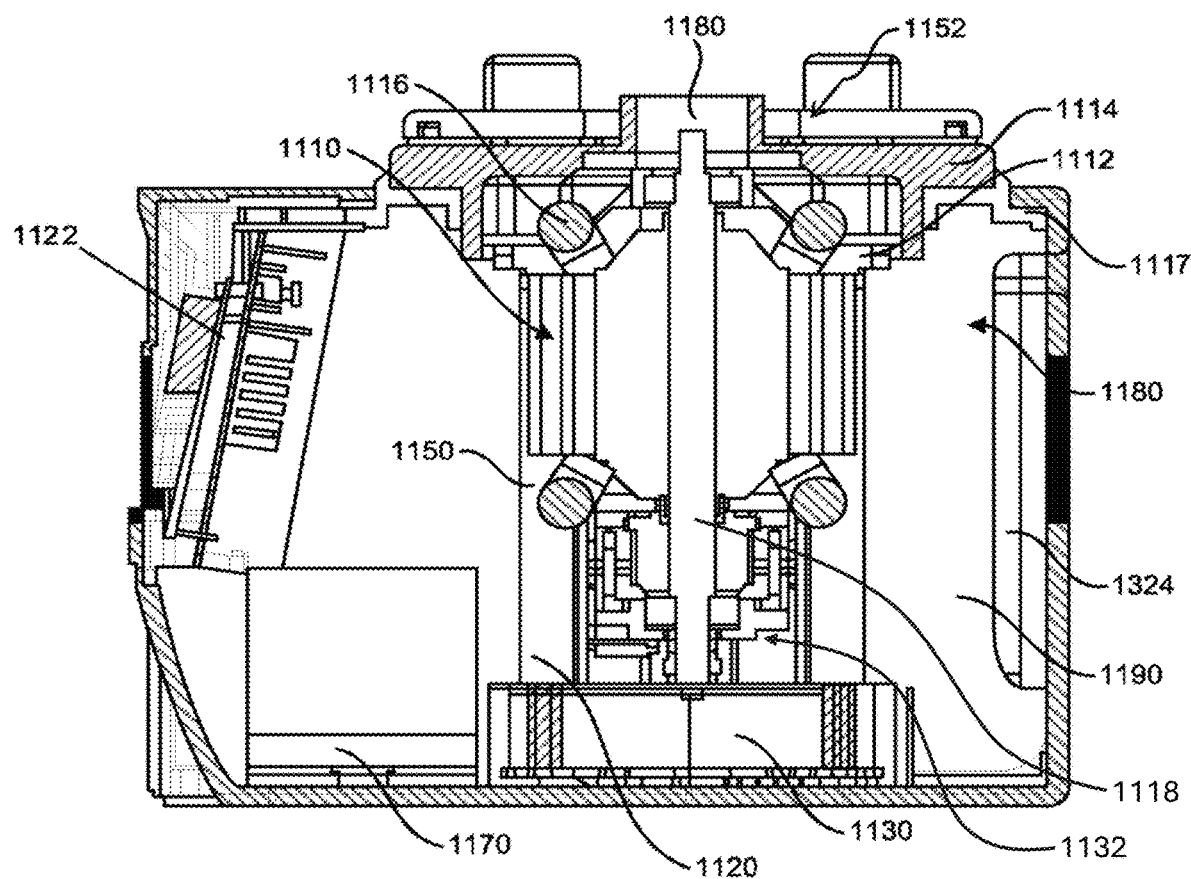
FIG. 12 is a side, cross-sectional view of the blending system of FIG. 11 in accordance with various disclosed embodiments.

The housing 1150 may include one or more air intakes, such as intake 1310 disposed at side 1105 and air intake 1312 disposed on side 1107 (e.g., see FIG. 11). Air intake 1310 may allow ambient air to be drawn into channel 1314 by operation of fan 1130. Channel 1314 may then allow air to the motor 1110 via an internal exhaust 1316 of the channel 1314. The ambient air is forced through the motor 1110 (e.g., through the motor bore) to cool the coils 1116 and other portions of the motor 1110.

As described herein, the channel 1314 may be formed through or into the insulating material 1190. In an aspect, the channel 1314 may be cut into the insulating material 1190, the insulating material 1190 may be formed to include the channel, or the like. The insulating material 1190 may reduce sound of air traveling through the channel 1314. In an aspect the intake 1310 may be in line of sight of the motor 1110.

In examples, the channel 1314 may be texturized due to the insulating material 1190. In another aspect, formations may be created or disposed within the channel 1314 to reduce noise, such as whiffles, baffles, or the like. In another aspect, the channel 1314 may include rounded or curved edges 1318 to reduce noise generation.

As the fan 1130 draws air through channel 1314 and into the motor 1110, the fan 1130 forces air through an internal intake 1320 of a channel 1324. Channel 1324 then allows air to exit through an exhaust 1326. As described herein, the channel 1324 may be formed through or into the insulating material 1190. In an aspect, the channel 1324 may be cut into the insulating material 1190, the insulating material 1190 may be formed to include the channel, or the like. The insulating material 1190 may reduce sound of air traveling through the channel 1324. In an aspect the exhaust 1326 may be in line of sight of the fan 1130. In examples, the channel 1324 may be texturized due to the insulating material 1190. In another aspect, formations may be created or disposed within the channel 1324 to reduce noise, such as whiffles, baffles, or the like. In another aspect, the channel 1324 may include rounded or curved edges 1324 to reduce noise generation.

According to at least some embodiments, the channel 1324 may comprise an input width 1330 of the internal intake 1320. The channel 1324 may increase in width to an exhaust width 1332. It is noted that the exhaust width 1332 may have a width ratio of i:1 compared to the input width 1330, where i is a number (e.g., 1.5:1, 2:1, 3:1, etc.). For instance, the exhaust width 1332 may be generally twice the width of the input width 1330.

Figure 15:
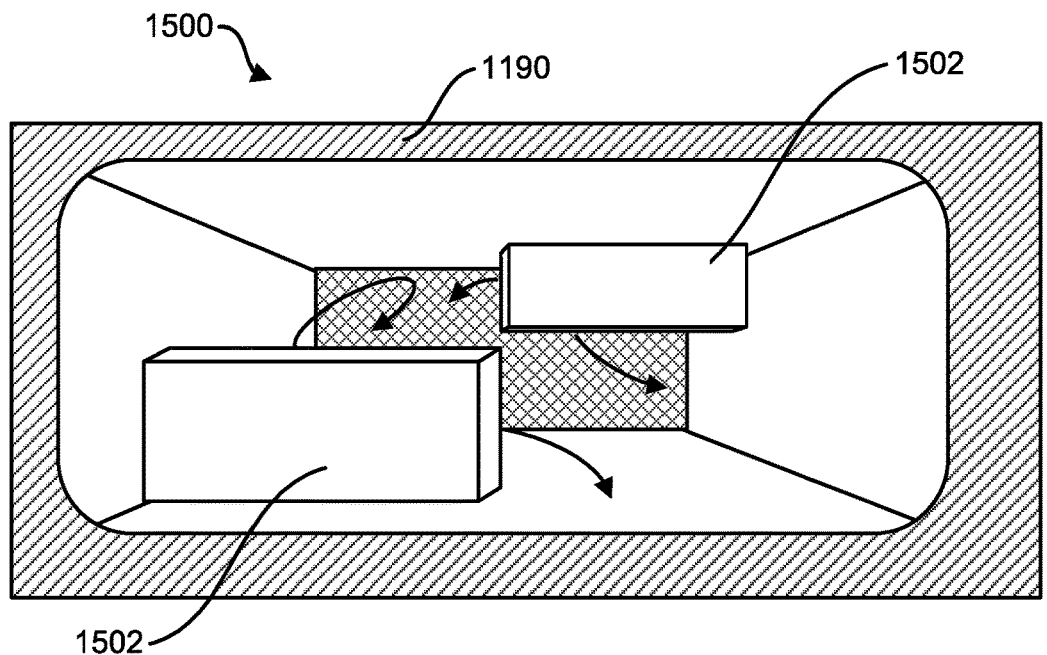
FIG. 15 is a cross-sectional view of an air channel with baffle in accordance with various disclosed embodiments.
Figure 16:
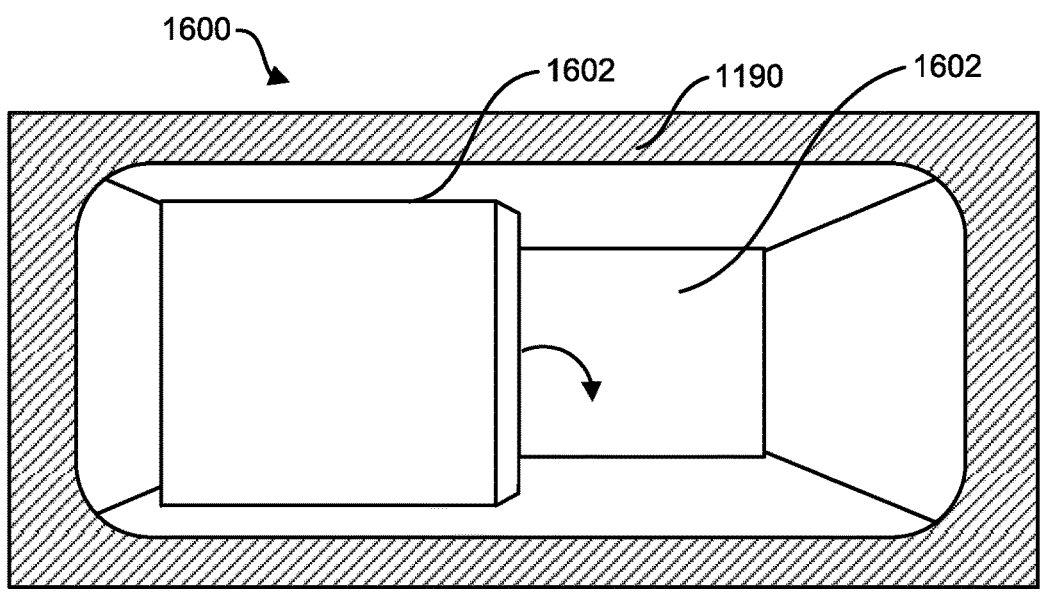
FIG. 16 is a cross-sectional view of an air channel with enlarged baffle in accordance with various disclosed embodiments.

Turning now to FIGS. 15 and 16, these are cross-sectional views of an air channel 1500 and 1600 (e.g., channel 1314, channel 1324) in accordance with an embodiment of the present disclosure. The air channels 1500 and 1600 may be formed in or through the insulating material 1190. It is noted that the insulating material may define the entirety of the air channels 1500 and 1600 or may comprise one or more sides and the housing 1150 may define one or more sides.

As air passes through the air channels 1500 and 1600, one or more baffles 1502, 1602 may impede the air channels 1500 and 1600 to absorb or dampen sound waves. The one or more baffles 1502, 1602 may comprise the same or different material as the insulating material 1190. In another aspect, the one or more baffles 1502, 1602 may be monolithically formed with the insulating material 1190 or may be attached or otherwise disposed to the insulating material 1190.

As shown the one or more baffles 1502 may extend partially through the air channel 1500 while the one or more baffles 1602 extend for the entire height of the air channels 1600. It is further noted that various embodiments may include other or different baffle arrangements, no baffles, or the like.

FIG. 17, illustrates an air channel 1700 comprising a liner 1710 operatively attached to the insulating material 1190. In an aspect, the liner 1710 may comprise a different material than the insulating material 1190. In some embodiments, the liner 1710 may comprise a heat resistant coating, film, or other layer. This may prevent the insulating material 1190 from absorbing heat or may limit heat absorption. This material may, for example, allow for increase head dissipation in a blender base as the insulating material 1190 may trap or otherwise absorb less heat. In another aspect, the liner 1710 may comprise a sound dampening coating, film, or other layer. For instance, the insulating material 1190 may comprise a firm, rubberized foam while the liner 1710 may comprise an acoustic foam, cloth, or other material. This material may reduce, absorb, or otherwise dampen noise.

It is noted that, in at least some embodiments, different air channels (e.g., channel 1314 or channel 1324) may comprise different liners relative each other. As an example, channel 1314 may comprise an acoustic foam liner and channel 1324 may comprise a heat resistant liner. It is further noted that the same channel may comprise different sections of liners or no liners at all.

Figure 18:
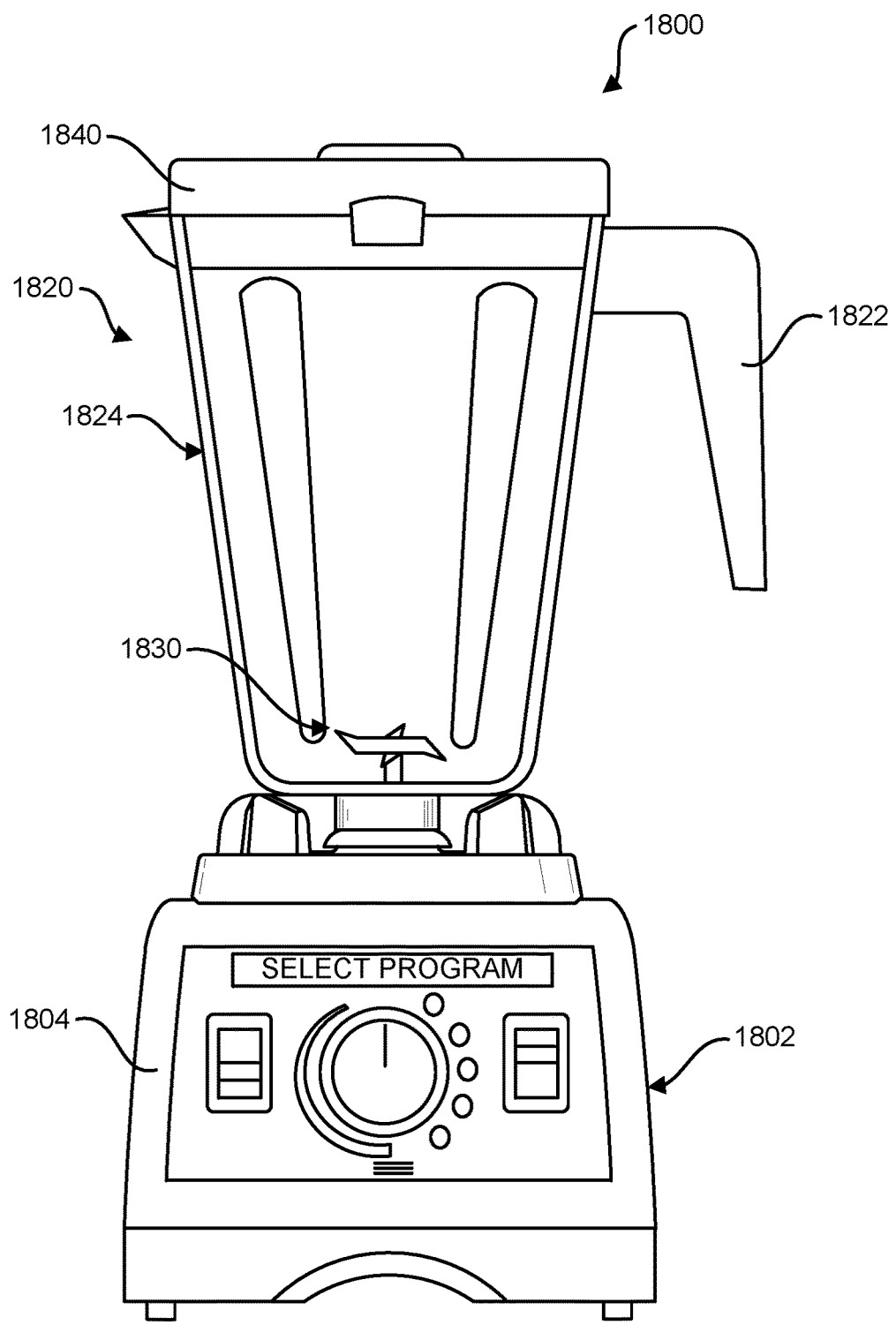
FIG. 18 is a blending system in accordance with various disclosed embodiments.

FIG. 18 illustrates an exemplary blending system 1800 in accordance with various disclosed embodiments. System 100, 200, 1100, etc. may utilize various disclosed aspects. For instance, system 1800 may include a large format container, or other blending container as described herein. It is noted that blending system 1800 may allow for interchangeable containers.

System 1800 primarily includes a blender base 1802, a container 1820 operatively attachable to the blender base 1802, a blade assembly 1830, and a lid 1840 that may be operatively attached to the container. The container 1820 may include walls 1824 and a handle 1822. Foodstuff may be added to the container 1820 for blending. It is noted that the container 1820 may comprise various materials such as plastics, glass, metals, or the like. In another aspect, container 1820 may be powered in any appropriate manner.

The blade assembly 1830, container 1820, and base 1802 may removably or irremovably attach. The container 1820 may be powered in any appropriate manner. While shown as a large-format system, system 1800 may comprise a single serving style system, where the container is filled, a blender base is attached to the container, and then the container is inverted and placed on a base. In another aspect, the container 1820 may comprise different sizes and shapes, such as cylindrical or the like.

The base 1802 includes a motor disposed within a housing 1804. The motor selectively drives the blade assembly 1830. The blade assembly 1830 may agitate, impart heat, or otherwise interact with contents within the container. Operation of the blender system 1800 may impart heat into the contents within container 1820, such as through a magnet and an exciter that operatively induce heat through rotation of the magnet relative the exciter.

In at least one embodiment, the blending system 1800 may identify or detect whether the system 1800 is interlocked through mechanical detection (e.g., push rods), user input, image recognition, magnetic detection (e.g., reed switches), electronic detection (e.g., inductive coils, a near field communication (NFC) component), or the like.

System 1800 and processes described herein generally relate to blending or food-processing systems and include a food-processing disc comprising one or more inductive coils. In another aspect, one or more of the disc(s) and/or lid may comprise an NFC component that may interact with an NFC component of a blender base. The NFC component of the blender base may receive information regarding the type of container and the blender base may utilize the information to determine a blending process to be utilized by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system, comprising:
a blender base comprising:
    a housing comprising a base wall and one or more side walls, the housing defining a cavity;
    a motor disposed within the cavity of the housing, the motor positioned to define a space within the cavity between the motor and the one or more side walls of the housing;
    a fan operatively driven by a second motor; and
    an insulating material dispersed throughout the space of the cavity, the insulating material contacting at least a portion of the one or more side walls of the housing and at least a portion of the motor, the insulating material defining at least one air channel therethrough, and the insulating material comprising a foam material dispersed throughout the space of the cavity.

2. The blender system of claim 1, wherein insulating material at least partially supports the motor.

3. The blender system of claim 1, further comprising a suspension bracket disposed between the motor and the housing, wherein the motor is operatively suspended from the suspension bracket.

4. The blender system of claim 3, wherein the suspension bracket comprises a semi-ridged thermoplastic elastomer.

5. The blender system of claim 1, wherein the at least one air channel defined by the insulating material allows for passage of ambient air into the housing and to the motor.

6. The blender system of claim 1, wherein the at least one air channel defined by the insulating material allows for passage of air from within the housing to an exhaust of the housing.

7. The blender of claim 1, wherein the insulating material generally fills open space in the cavity except for at least one air channel.

8. The blender system of claim 1, further comprising a controller that operatively controls the fan at a different speed than the motor.

9. The blender system of claim 1, wherein the blender base further comprises at least one sensor operatively sensing a temperature within the housing.

10. The blender system of claim 1, wherein the fan is configured to be driven when the motor is not operating.

11. A blender system, comprising:
a blender container operatively coupled to a blade assembly; and
a blender base comprising:
a housing comprising a base wall and one or more side walls, the housing defining a cavity;
a motor disposed within the cavity of the housing, the motor positioned to define a space within the cavity between the motor and the one or more side walls of the housing, wherein the motor operatively drives the blade assembly;
a fan comprising a fan motor, the fan configured to be driven by the motor and the fan motor to force air through the housing; and
an insulating material dispersed throughout the space of the cavity and between the motor and the housing, the insulating material contacting at least a portion of the one or more side walls of the housing and at least a portion of the motor, wherein the insulating material defines at least one air channel in fluid communication with the fan,
wherein the blender container is operatively attached to the blender base.

12. The blender system of claim 11, wherein the insulating material comprises a foam material.

13. The blender system of claim 11, wherein the insulating material contacts at least a portion of the housing and at least a portion of the motor.

14. The blender system of claim 13, wherein the insulating material occupies space between the housing and the motor, such that the at least one air channel defines the only open space within the cavity.

15. The blender system of claim 11, wherein the at least one air channel includes at least one baffle.

16. The blender system of claim 11, wherein the insulating material comprises compressed insulating material between the housing and the motor.

17. A blender system comprising:
a blender base comprising a housing comprising a cavity defined by a base wall and one or more side walls, wherein the housing houses a motor, a motor drive shaft, a fan comprising a fan motor, and a control board within the cavity, wherein the motor is positioned to define a space within the cavity between the motor and the one or more side walls, and wherein the fan is configured to be driven by the motor and the fan motor; and
a sound insulating material dispersed throughout the space of the cavity, the sound insulating material contacting at least a portion of the one or more side walls and at least a portion of the motor, and wherein the sound insulating material is disposed around the motor, the motor drive shaft, the fan, and the control board.

18. The blender system of claim 17, wherein the sound insulating material further defines an air flow path between at least one air inlet and at least one exhaust.

19. The blender system of claim 18, wherein the fan is disposed within the air flow path between the motor and the at least one exhaust.

20. The blender system of claim 17, wherein the sound insulating material supports at least one of the motor or the fan.

* * * * *